United States Patent
Danilov et al.

(10) Patent No.: US 11,526,297 B2
(45) Date of Patent: Dec. 13, 2022

(54) FRAMED EVENT ACCESS IN AN ORDERED EVENT STREAM STORAGE SYSTEM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 93 days.

(21) Appl. No.: 17/152,544

(22) Filed: Jan. 19, 2021

(65) Prior Publication Data

US 2022/0229581 A1 Jul. 21, 2022

(51) Int. Cl.
G06F 3/06 (2006.01)
(52) U.S. Cl.
CPC ............ G06F 3/0655 (2013.01); G06F 3/067 (2013.01); G06F 3/0622 (2013.01)
(58) Field of Classification Search
CPC .... G06F 3/0619; G06F 3/0622; G06F 3/0634; G06F 3/0655; G06F 3/0656; G06F 3/067; G06F 3/0683
USPC ........ 710/30, 41, 42, 59; 711/150, 153, 154, 711/164, 168
See application file for complete search history.

(56) References Cited

U.S. PATENT DOCUMENTS

| | | |
|---|---|---|
| 3,617,587 A | 11/1971 | Nayar et al. |
| 5,826,977 A | 10/1998 | Fowler et al. |
| 7,430,570 B1 | 9/2008 | Srinivasan et al. |
| 8,572,091 B1 | 10/2013 | Sivasubramanian et al. |
| 8,655,825 B2 | 2/2014 | Roesch et al. |

(Continued)

FOREIGN PATENT DOCUMENTS

| | | |
|---|---|---|
| CA | 2672879 | 4/2008 |
| CN | 1708029 | 12/2005 |

(Continued)

OTHER PUBLICATIONS

Office Action dated Apr. 20, 2022 for U.S. Appl. No. 16/944,094, 48 pages.

(Continued)

*Primary Examiner* — Gary J Portka
(74) *Attorney, Agent, or Firm* — Amin, Turocy & Watson, LLP

(57) ABSTRACT

Framed event access in an ordered event stream (OES) storage system is disclosed. Events can be written to one or more segments of an OES and can have an inherent write sequence. Segments can be parallel segments. Reading events from parallel segments can result in a read sequence that does not match the write sequence. This mismatch can be more severe as segment length increases, as event density disparities increase, as access times diverge for different segments, or for numerous other reasons. Event framing can compartmentalize divergence between the write and read sequence. In an aspect, readers in the several segments of the OES can be constrained to read within a frame defined by frame boundaries until all readers have reached the frame boundary, then can advance to a next frame. The restriction can act as a pseudo-synchronization of readers that can mitigate difference between write and read sequences.

20 Claims, 10 Drawing Sheets

(56) References Cited

U.S. PATENT DOCUMENTS

| | | | |
|---|---|---|---|
| 8,825,848 | B1 | 9/2014 | Dotan et al. |
| 8,984,248 | B2 | 3/2015 | Morishita et al. |
| 9,407,521 | B1 | 8/2016 | Kulkarni |
| 9,514,018 | B2 | 12/2016 | Sikri |
| 9,639,589 | B1 | 5/2017 | Theimer et al. |
| 9,753,932 | B1 | 9/2017 | Brow et al. |
| 9,898,482 | B1 | 2/2018 | Bono |
| 9,965,215 | B1 | 5/2018 | Vazhenin et al. |
| 10,338,834 | B1 | 7/2019 | Dighe et al. |
| 10,565,208 | B2 | 2/2020 | Triou, Jr. et al. |
| 10,860,457 | B1 | 12/2020 | Evenson et al. |
| 10,867,033 | B2 | 12/2020 | Keren et al. |
| 11,016,826 | B2 | 5/2021 | Lehmann |
| 11,194,638 | B1 | 12/2021 | Danilov et al. |
| 11,314,779 | B1 | 4/2022 | Jain |
| 2004/0199524 | A1 | 10/2004 | Rys et al. |
| 2005/0025152 | A1 | 2/2005 | Georgiou et al. |
| 2005/0055519 | A1 | 3/2005 | Stuart et al. |
| 2007/0047635 | A1 | 3/2007 | Stojanovic et al. |
| 2007/0220518 | A1 | 9/2007 | Verbowski et al. |
| 2008/0059724 | A1* | 3/2008 | Stifter, Jr. .......... H04N 21/242 711/E12.013 |
| 2008/0184262 | A1 | 7/2008 | Ginis et al. |
| 2008/0288713 | A1 | 11/2008 | Lee et al. |
| 2008/0301135 | A1 | 12/2008 | Alves et al. |
| 2009/0182784 | A1 | 7/2009 | Rohit et al. |
| 2010/0083098 | A1 | 4/2010 | Leme et al. |
| 2010/0125794 | A1 | 5/2010 | Hampton et al. |
| 2010/0205163 | A1 | 8/2010 | Eshghi et al. |
| 2011/0126099 | A1 | 5/2011 | Anderson et al. |
| 2011/0131588 | A1 | 6/2011 | Allam et al. |
| 2011/0249147 | A1 | 10/2011 | Ishii |
| 2012/0102503 | A1 | 4/2012 | Meijer et al. |
| 2012/0109985 | A1 | 5/2012 | Chandrasekaran |
| 2012/0198027 | A1 | 8/2012 | Hetzler et al. |
| 2013/0226931 | A1 | 8/2013 | Hazel et al. |
| 2013/0275808 | A1 | 10/2013 | McNeeney et al. |
| 2014/0006465 | A1 | 1/2014 | Davis et al. |
| 2014/0089264 | A1 | 3/2014 | Talagala et al. |
| 2014/0223115 | A1 | 8/2014 | Dinkjian et al. |
| 2015/0169449 | A1 | 6/2015 | Barrell et al. |
| 2015/0172120 | A1 | 6/2015 | Dwarampudi et al. |
| 2015/0341212 | A1 | 11/2015 | Hsiao et al. |
| 2015/0355862 | A1 | 12/2015 | Hayes et al. |
| 2015/0363245 | A1 | 12/2015 | Mutschler |
| 2016/0042008 | A1* | 2/2016 | Tripathy ............ G06F 3/0641 707/692 |
| 2016/0063080 | A1 | 3/2016 | Nano et al. |
| 2016/0210061 | A1 | 7/2016 | Soncodi et al. |
| 2016/0321287 | A1 | 11/2016 | Luthra et al. |
| 2016/0337435 | A1 | 11/2016 | Nigam et al. |
| 2016/0357476 | A1 | 12/2016 | Chen et al. |
| 2017/0075832 | A1 | 3/2017 | Bhimani et al. |
| 2017/0075947 | A1 | 3/2017 | Kurilov et al. |
| 2017/0177249 | A1 | 6/2017 | Kurilov et al. |
| 2017/0177263 | A1 | 6/2017 | Das et al. |
| 2017/0212891 | A1 | 7/2017 | Pundir et al. |
| 2017/0213127 | A1 | 7/2017 | Duncan |
| 2017/0255392 | A1 | 9/2017 | Nakashima |
| 2018/0101842 | A1 | 4/2018 | Ventura et al. |
| 2018/0121307 | A1 | 5/2018 | Braun et al. |
| 2018/0146018 | A1* | 5/2018 | Chang .............. H04N 21/41407 |
| 2018/0176244 | A1 | 6/2018 | Gervais et al. |
| 2018/0184138 | A1 | 6/2018 | Shaw et al. |
| 2018/0329644 | A1 | 11/2018 | Das et al. |
| 2018/0332325 | A1 | 11/2018 | Kaitchuck |
| 2018/0332365 | A1 | 11/2018 | Kaitchuck et al. |
| 2018/0332366 | A1 | 11/2018 | Paduroiu |
| 2018/0332367 | A1 | 11/2018 | Kaitchuck et al. |
| 2018/0336256 | A1 | 11/2018 | Li et al. |
| 2018/0345140 | A1 | 12/2018 | Posin |
| 2019/0004863 | A1 | 1/2019 | Mainali et al. |
| 2019/0026301 | A1 | 1/2019 | Wang et al. |
| 2019/0057138 | A1 | 2/2019 | Knowles et al. |
| 2019/0129806 | A1 | 5/2019 | Hsu et al. |
| 2019/0138494 | A1 | 5/2019 | Inoue |
| 2019/0197173 | A1 | 6/2019 | Tahara et al. |
| 2019/0278849 | A1 | 9/2019 | Chandramouli et al. |
| 2019/0340180 | A1 | 11/2019 | Barsness et al. |
| 2019/0349422 | A1 | 11/2019 | Dhruvakumar et al. |
| 2020/0034468 | A1 | 1/2020 | Lei et al. |
| 2020/0174695 | A1 | 6/2020 | Bazarsky et al. |
| 2020/0250172 | A1 | 8/2020 | Busjaeger et al. |
| 2020/0320005 | A1 | 10/2020 | Shulman et al. |
| 2020/0344299 | A1 | 10/2020 | Sohail et al. |
| 2020/0394196 | A1 | 12/2020 | Shivanna et al. |
| 2020/0404011 | A1 | 12/2020 | Gervais et al. |
| 2021/0110328 | A1 | 4/2021 | Hsiao et al. |
| 2021/0124746 | A1 | 4/2021 | Klaedtke |
| 2021/0157520 | A1 | 5/2021 | Bavishi et al. |
| 2021/0256029 | A1 | 8/2021 | Danilov et al. |
| 2021/0342296 | A1 | 11/2021 | Danilov et al. |
| 2021/0342354 | A1 | 11/2021 | Danilov et al. |
| 2021/0365211 | A1 | 11/2021 | Danilov et al. |
| 2022/0035533 | A1 | 2/2022 | Danilov et al. |
| 2022/0182724 | A1* | 6/2022 | Gupta .............. H04N 21/47217 |

FOREIGN PATENT DOCUMENTS

| | | |
|---|---|---|
| CN | 104901958 | 9/2015 |
| CN | 105591926 | 5/2016 |
| GB | 2377038 | 12/2002 |
| WO | 2002101585 | 12/2002 |
| WO | 2009014993 | 1/2009 |
| WO | 2015191120 | 12/2015 |
| WO | 2018148149 | 8/2018 |

OTHER PUBLICATIONS

M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).

Notice of Allowance dated Apr. 27, 2022 for U.S. Appl. No. 17/127,724, 19 pages.

Office Action dated May 24, 2022 for U.S. Appl. No. 17/237,535, 62 pages.

Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).

Office Action dated Mar. 21, 2022 for U.S. Appl. No. 16/864,905, 125 pgs.

Edi Muskardin et al.,"Implementation of Hashing Algorithms in Stream Mining", International Conference on Smart Systems and Technologies (SST), Oct. 2018 , pp. 233-238.

Notice of Allowance dated Apr. 11, 2022 for U.S. Appl. No. 16/944,089, 87 pages.

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154 (Year: 2014).

Office Action dated Apr. 12, 2022 for U.S. Appl. No. 17/038,102, 48 pages.

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

(56) References Cited

OTHER PUBLICATIONS

"Apache Beam Programming Guide" [https://beam.apache.org/documentation/programming-guide/]. The Apache Software Foundation. Retrieved Aug. 26, 2020, 69 pages.
"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.
"What is Apache Flink?—Architecture" [https://flink.apache.org/flink-architecture.html]. The Apache Software Foundation. Copyright 2014-2019, retrieved Aug. 26, 2020, 3 pages.
"Stateful Function—Event-driven Application on Apache Flink" [https://flink.apache.org/stateful-functions.html]. The Apache Software Foundation. Copyright 2014-2019, retrieved Aug. 26, 2020, 8 pages.
"What is Apache Flink?—Operations" [https://flink.apache.org/flink-operations.html]. The Apache Software Foundation. Copyright 2014-2019, retrieved Aug. 26, 2020, 3 pages.
"Use Cases" [https://flink.apache.org/usecases.html]. The Apache Software Foundation. Copyright 2014-2019, retrieved Aug. 26, 2020, 5 pages.
"Introduction" [http://kafka.apache.org/intro]. The Apache Software Foundation. Copyright 2017, retrieved Aug. 26, 2020, 6 pages.
"Apache Kafka Quickstart" [http://kafka.apache.org/quickstart]. The Apache Software Foundation. Copyright 2017, retrieved Aug. 26, 2020, 6 pages.
"Use Cases" [http://kafka.apache.org/uses]. The Apache Software Foundation. Retrieved Aug. 26, 2020, 3 pages.
"Architecture Overview" [pulsar.apache.org/docs/en/concepts-architecture-overview/]. The Apache Software Foundation. Copyright 2020, retrieved Aug. 26, 2020, 11 pages.
"Messaging" [pulsar.apache.org/docs/en/concepts-messaging/]. The Apache Software Foundation. Copyright 2020, retrieved Aug. 26, 2020, 32 pages.
"Pulsar Overview" [pulsar.apache.org/docs/en/concepts-overview/]. The Apache Software Foundation. Copyright 2020, retrieved Aug. 26, 2020, 2 pages.
Office Action dated Jan. 29, 2021 for U.S. Appl. No. 16/256,083, 42 pages.
Notice of Allowance dated Jun. 28, 2021 for U.S. Appl. No. 16/884,647, 39 pages.
Office Action dated Jun. 29, 2021 for U.S. Appl. No. 16/881,556, 24 pages.
Notice of Allowance dated Aug. 4, 2021 for U.S. Appl. No. 17/200,652, 51 pages.
Office Action dated Oct. 1, 2021 for U.S. Appl. No. 17/127,724, 41 pages.
Notice of Allowance dated Dec. 15, 2021 for U.S. Appl. No. 17/064,747, 54 pages.
Office Action dated Nov. 10, 2021 for U.S. Appl. No. 16/944,089, 75 pages.
Kleppmann, Making Sense of Stream Processing—The Philosophy Behind Apache Kafka and Scalable Stream Data Platforms; Mar. 4, 2016; retrieved from [https://hashingit.com/elements/research-resources/2016-03-04-making-sense-of-stream-processing.pdf] on Nov. 5, 2021, (Year: 2016), 183 pages.
Notice of Allowance dated Feb. 4, 2022 for U.S. Appl. No. 16/915,762, 57 pages.
Office Action dated Oct. 1, 2021 for U.S. Appl. No. 16/915,762, 57 pages.
Office Action dated Jan. 21, 2022 for U.S. Appl. No. 16/864,892, 26 pages.
Notice of Allowance dated Feb. 24, 2022 for U.S. Appl. No. 17/038,079, 55pgs.
Azhar et al., "Efficient selection of access control systems through multi criteria analytical hierarchy process", IEEE, doi: 10.1109/ICET.2012.6375419, 2012, pp. 1-8. (Year: 2012).
Rox et al., "Construction and Deconstruction of Hierarchical Event Streams with Multiple Hierarchical Layers", IEEE, doi: 10.1109/ECRTS.2008.13, 2008, pp. 201-210. (Year: 2008).
Notice of Allowance dated Feb. 18, 2022 for U.S. Appl. No. 17/083,145, 70 pgs.
Office Action dated Oct. 27, 2022 for U.S. Appl. No. 17/063,906, 59 pages.
Office Action dated Jul. 8, 2022 for U.S. Appl. No. 16/864,892, 33 pages.
Office Action dated Jul. 15, 2022 for U.S. Appl. No. 16/864,905, 77 pages.
Office Action dated Sep. 1, 2022 for U.S. Appl. No. 16/944,094, 25 pages.
Office Action dated Jul. 21, 2022 for U.S. Appl. No. 17/070,029, 68 pages.
Office Action dated Sep. 30, 2022 for U.S. Appl. No. 17/408,344, 66 pages.
Office Action dated Sep. 15, 2022 for U.S. Appl. No. 17/383,425, 61 pages.
Phaujdar, "Understanding Event Streams—A Comprehensive Guide 101_ Learn Hevo" [https://hevodata.com/learn/understanding-event-streams/] (Feb. 17, 2021) (Year: 2021).
Dhanushka, "Understanding Kafka Topic Partitions" [https://medium.com/event-driven-utopia/understanding-kafka-topic-partitions-ae40f80552e8] -(Mar. 28, 2021) (Year: 2021).
Splunk, "Comparing Pulsar and Kafka" [https://www.splunk.com/en_us/blog/it/comparing-pulsar-and-kafka-how-a-segment-based-architecture-delivers-better-performance-scalability-and-resilience.html] -(Dec. 5, 2017) (Year: 2017).

* cited by examiner

FRAMED EVENT ACCESS IN AN ORDERED EVENT STREAM STORAGE SYSTEM

TECHNICAL FIELD

The disclosed subject matter relates to data storage and, more particularly, to ordered access to an event of an ordered event stream of a stream data storage system.

BACKGROUND

Conventional data storage techniques can employ an event stream, e.g., storing data corresponding to stream events in a logical order. In a conventional system, an event stream can provide for storing a generally unbounded stream of events whereby a portion of the stored events can then be read out in the order they were stored. One use of data storage is in bulk data storage. Access to stored events according to an order is desirable. Framed event access can provide ordering of event access contemporaneously via one or more segments of an event stream storage system.

DETAILED DESCRIPTION

Figure 1:
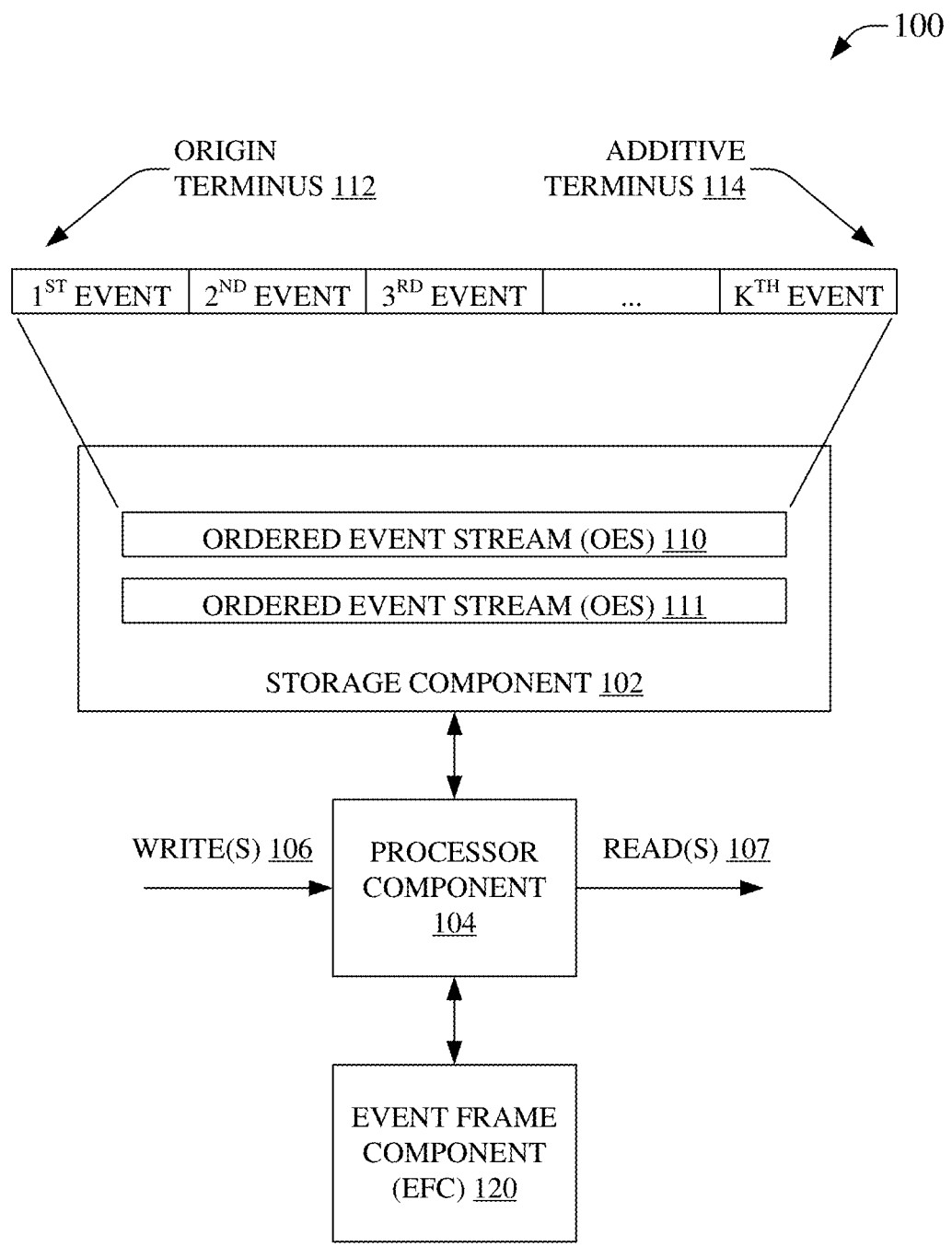
FIG. 1 is an illustration of an example system that can facilitate framed event access to an event stored via a segment of an ordered event stream, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

In general, an ordered event stream (OES), or a 'stream' for convenience, can be a durable, elastic, append-only, unbounded sequence of events. An example of an ordered event streaming storage system can be STREAMING DATA PLATFORM by DELL EMC. An event can be added to a head of a stream of events, e.g., a first event can be considered at a tail of an event stream and a most recent event can be regarded as being at the head of the stream with other events ordered between the tail and the head of the stream. The events need not be stored in contiguous storage locations to be logically sequenced in the stream representation of physical storage, e.g., a first event can be stored on a first disk, a second event on a remotely located second disk, and a third event stored at a further remote third disk, the stream can logically sequence the first, second, and third events by reference to their stored data in different physical locations, the OES can be regarded as an abstraction of physical storage that can store the events in an ordered manner, etc. It is noted that some stream systems, e.g., PRAVEGA by DELL EMC, etc., can employ an alternate head/tail terminology, for example, in PRAVEGA a first event can be added at a head of an OES, while subsequent new events can then be added to a tail of the OES, however, this is indistinguishable in all other aspects from the head/tail convention generally employed in the instant disclosure. Every event of the stream can be associated with a routing key, or simply a 'key' for convenience. A key can often be derived from data corresponding to the event, e.g., a "machine-id," "location," "device type," "customer number," "vehicle identifier," etc. In an aspect, an event can be associated with a key, however, data yet to be written to an event can be associated with a access target value that can be the same value as the key, e.g., the access target value can be determined based on the data of the event, a characteristic corresponding to the event to be recorded, etc., such that the access target value can be regarded to be the same as the key. Accordingly, the term event key, hashed key value, access target value, key, etc., can be used interchangeably for convenience unless the context indicates a more specific use, for example, an access target value can correspond to data to be stored in an event and can be derived from that data or other characteristics corresponding to the data such that when the event is stored the access target value can be used as the key associated with storing the event. Similarly, in a read operation, an access target value can be indicated to allow access to an event having a key that matches the access target value because the event was written to the OES according to a key that can be the same as the access target value. Generally speaking, the term access target value can relate to a 'key value' such that access to events of an OES can be based on comparing the access target value to key values for actual stored events, where an existing event is to be read, or key values that will be used to store an event, where an event will be written into the OES at the access target value. Again, it is generally easier to just use the term key for both access target value and routing key unless more specificity is needed in some given example, and this convention is generally used in the instant disclosure for simplicity and brevity, as an example, a key can be determined when an event is stored, e.g., the event is stored according to the key, such that a read instruction for events of 'the key' can return event(s) stored according to the key. Events with the same routing key can be written to a corresponding stream or stream segment, and can also be consumed, e.g., read, in the order they were written to the stream or stream segment.

In an aspect, an OES can comprise one or more stream segments. A segment of an event stream can generally be associated with a single processing instance to assure ordering of the events logically added to the segment. A processing instance can be a single real physical processor, a virtualized processor executing on one or more real physical processors, a group of real physical processors, a group of virtual processors executing on one or more real physical processors, etc. As an example, a processing instance can be a blade server of a rack system. As another example, a processing instance can be a virtual processor deployed in an elastic computing system, e.g., a 'cloud server,' etc. Typically the processing instance can be associated with a level of performance which, in some embodiments, can be measured via one or more key performance indicators (KPIs) for the processing instance. As an example, a first blade server of a rack can have a first level of performance and a second blade server of a rack can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed per unit time by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support or manpower costs, real estate for deployment costs, etc. As such, selecting an appropriate processing instance can be associated with optimizing cost(s). As an example, if an event stream consumes less than one unit of work, then pairing the stream with a processing instance that can perform one unit of work can be a more optimal use of computing resources, e.g., lower overall aggregate costs, etc., than pairing the event stream with a processing instance that can perform 200 units of work which can result in 'wasting' up to 199 units of work through underutilization. Moreover, in this example, the 200 unit processing instance, for example, can be a newer high end processing instance that can have a high monetary cost, and generate more heat than the one unit processing instance that, for example, can be a low cost commodity processing instance that is plentiful, has a low monetary cost, and is already widely deployed. As such, paring the one unit of work event stream with a race car of a performance instance can be understood as possibly not being an optimal pairing in comparison to a more pedestrian performance instance.

Where an OES can be comprised of one or more portions, e.g., segments, shards, partitions, pieces, etc., that can generally be referred to as segments for convenience, a segment of an OES can act as a logical container for one or more events within the OES. When a new event is written to a stream, it can be stored to a segment of the stream based on a corresponding event routing key. An event routing key can be hashed with other event routing keys to form a "key space". The key space can be employed to 'divide' the stream into a number of parts, e.g., segments. In some embodiments, consistent key hashing can be employed to assign events to appropriate segments. As an example, where a stream comprises only one segment, all events to be written to the stream can be written to the same segment in an ordered manner and the only one segment can correspond to the entire key space. As another example, where a stream comprises two segments, the key space can be associated with the two segments, e.g., the total key space can extend from zero to 'n', however each of the two segments can be associated with a portion of the total key space, for example, the first segment can be employed to store events with a key between zero and 'n' and the second segment can be employed to store events with a key between 'm+1' and 'n'. It will be appreciated that more segments can be employed to further divide the key space such that a segment can store an event with a key falling within the range of the key space associated with that segment. As an example, a four segment OES can have each segment store data for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0, etc. Other example divisions of the key space in this example, such as asymmetric division of the key space, etc., are readily appreciated and are not further recited for the sake of clarity and brevity.

Moreover, an OES stream can have a topology that evolves. An evolution of an OES topology can be related to different epochs. As an example, an OES can initially have a first segment, but where writing of events increases above a threshold level, the OES can be scaled to comprise two segments, e.g., a second segment and a third segment. In an aspect, each of the second and third segments can employ a separate processor instance to write events, e.g., scaling the OES can correspond to an increase in the count of processors writing events to the OES. Accordingly, a hashed key space can be divided to encompass the second and third segments of the scaled OES, e.g., the example OES can initially have the first segment covering a key space of 0 to 1, and after the scaling, the second segment can cover events from zero up to 0.25 of the key space and the third segment can cover events from 0.25 to 1 of the key space. The example scaling of the OES can constitute an 'epoch change', e.g., evolution of the topology of the OES, such that before the scaling the OES had the first segment in a first epoch, e.g., 'Epoch 1', and, after the scaling, the OES can have a second and third segment in a second epoch, e.g., 'Epoch 2'. In an aspect, the first segment can be closed at the change in epoch, and thereby, the second and third segments can correspondingly be opened at the epoch change. In this way, in Epoch 1 there is one segment for all of the key space zero to one and, in Epoch 2, there are two segments, each covering a portion of the total key space. In an aspect, storage schemes can be different in different epochs, e.g., the topology change of the OES can result in a change in storage scheme. Returning to the above example, reading an event with a key space value of 0.75 in the first epoch can read from the first segment and can be distinct from reading another event with a key space value of 0.75 in the second epoch that would read from the third segment. The use of different storage schemes for events of an OES, e.g., an OES having different OES segment schemes across epochs of an OES, can be associated with reading out OES events according to those different storage schemes in their corresponding epochs.

An OES storage scheme can correspond to a distribution of a hashed key space to segments of an OES. As an example, a first OES storage scheme can have a hashed key space extends from 0 to 1, wherein a first segment can store events having a hashed key value 'y' between 0 and 0.28, e.g., $0 \leq y < 0.28$, and a second segment of the OES can store events having 'y' between 0.28 and 1, e.g., $0.28 \leq y < 1$. The example first OES storage scheme can be altered to a next storage scheme, e.g., advanced to a second epoch, wherein the first and second segment can be closed and a third and fourth segment can be opened wherein third segment can store events having a hashed key value 'y' between 0 and 0.7, e.g., $0 \leq y < 0.7$, and the fourth segment of the OES can store events having 'y' between 0.7 and 1, e.g., $0.7 \leq y < 1$. Moreover, the second epoch can end when a third epoch is begun that represents a third OES storage scheme, for example, closing the third and fourth segments and opening fifth through seventh segments, wherein the fifth segment can store events having a hashed key value 'y' between 0 and 0.1, e.g., $0 \leq y < 0.1$, the sixth segment can store can store events having 'y' between 0.1 and 0.5, e.g., e.g., $0.1 \leq y < 0.5$, and the seventh segment can store can store events having 'y' between 0.5 and 1, e.g., $0.5 \leq y < 1$.

Generally, changes to an OES storage scheme, e.g., an epoch change, etc., can be in response to an indication that computing resources transition a level of burden, e.g., where a processor becomes burdened, another processor can be added and the key space can be divided between the increased number of processors in a new epoch. An event stream can be divided, symmetrically or asymmetrically, to increase an amount of computing resources available to each segment of an OES. As an example, if an initial event stream causes a load of two units of work for a first processor, and the two units of work load correspond to an even distribution of work across the associated key space of the initial event stream, and the two units of work can exceed a threshold work level of the example first processor, then the stream can be split into two segments and a second processor can be added. In this example, after the scaling of the stream, the first processor can now support a second segment, in lieu of the initial one segment, at about one unit of work and a third segment can be supported by the second processor, also at about one unit of work, assuming the work load from the initial stream was roughly evenly split between the key spaces of the new epoch.

Transitions between OES epochs, e.g., changing OES storage schemes can be related to changing write and read demands associated with a stream of data. As an example, writing ride share service events to an OES can be according to OES segments that can divide the hashed key space into regions, e.g., a west region, a central region, and an east region. In this example, as peak demand for ride share services can be associated with the time zones, for example being busier in the east zone at local 5 pm than in the west zone that would be at a local time of 2 pm. A such, there can be more demand, in this example, to write data to the OES segment corresponding to the east region and the storage scheme can meet this demand by scaling the OES segment to allow more east region data to be written, e.g., splitting the example OES segment to more segments to allow engaging more processors, which, in some embodiments, can increase the hashed key space related to the now plural OES segments for east region event writing. Moreover, as time continues, demand can increase in the west region and wane in the east region, for example 5 pm in the west can be 8 pm in the east. As such, the east region segments can be scaled down and the west region segments can be scaled up, e.g., effectively shifting processing power to storage of west region events rather than east region events. The change in scaling of the segments of the OES can be associated with a change in storage scheme and a change in OES storage epochs, etc.

Conventional event stream storage techniques, for example, can result in storage of many events objects in one or more segments of a stream. Generally, access to events in an order can be desirable, e.g., reading events out in the order in which they were written can be desirable, thus jumbling the readout order of events can complicate use of the event data by a customer. In a conventional stream a write order can easily correspond to readout order, e.g., sequential writes to a single segment on a single storage medium can be easily readout in the same sequence. However, in more complex streams, for example as disclosed herein, streams can comprise multiple parallel segments, multiple epochs, disparate physical storage devices, or other complexities, that can complicate reading out events in a meaningful order. As a simple example, where 100,000 events are evenly written to a two-segment stream, and where reading the first stream can occur twice as fast as reading the second stream, some mix of the first 75,000 events from the first and second segment can be read out followed by the last 25,000 events of the second segment, e.g., 50,000 events of the first stream and 25,000 events of the first stream are read out in a mixed manner already departing from the order in which they were written, followed by reading out the remaining 25,000 events of the second segment well after all the events of the first segment are read, which can compound the improper ordering of the read out events.

In an aspect, a solution can be to time stamp events to allow reconstitution of the event sequence after events are read. However, this can be problematic for additional reasons. These reasons can include needing to increase the size of the data stored, e.g., adding a time stamp to an event can increase the storage needed to store the event and the time stamp in contrast to not storing a time stamp. Additionally, the clocks used to perform time stamping can require synchronization to be meaningful, e.g., time stamping with time discrepancies greater than the event sequence resolution can result in out of order event reads. Furthermore, ordering of the events based on a time stamp, e.g., reconstituting the sequence of events, can consumer computing resources, e.g., the client side is generally not as thin as if time stamping is not employed. As such, conventional systems can either pay the penalties noted for time stamping or can rely on writing events in a single stream so that they can be written in the same order and in the same location from which they can later be read out.

In contrast, the presently disclosed subject matter illustrates event framing to enable ordering of event reads. The disclosed subject matter can leverage that storage in modern streams can be via cluster-based type data storage, e.g., an OES can be a logical abstraction of one or more real storage nodes comprising one or more real storage components, comprising one or more physical storage elements, for example, a physical/real cluster can comprise first real nodes at a first data center in Tokyo and second real nodes at a second data center in Galway. Generally, cluster-based storage can be associated with delays, for example due to network conditions, differences in a type of storage used, processor demand fluctuations, or nearly any other computing resource differences. These delays are typically considered unavoidable but bearable costs of using cluster-based storage. Accordingly, lack of a strict readout sequence can be an accepted cost of employing cluster-based storage. However, it can still also typically be desirable to have better sequence preservation even where sequence preservation is not perfect. The disclosed subject matter can therefore enable reading events in batches to limit loss of proper sequence to the extents of the batch, e.g., the events can be read out in frames. As an example, reading 100,000 events from two segments at a 1× and 0.5× speed correspondingly, can result in mixed reading of 75,000 events and then single reading of 25,000 events, as is noted in an example hereinabove, leading to the last 25,000 events being highly out of sequence. However, in this example, employing 100 event frames can result in reading 75 mixed events followed by reading 25 single events. In this example, the sequence in the frame of 100 events is perturbed, but repeating this framing for the entire 100,000 events can result in the last 100 events having a similar perturbation as the first 100 event reads. This can be a sharp improvement over the perturbation of the last 25,000 events demonstrated in the example without framing. It is further noted that there is sequence perturbation in the mixed event reads that is also improved over non-framed reads. These aspects are discussed in more detail elsewhere herein.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate framed event access to an event stored via a segment of an ordered event stream, in accordance with aspects of the subject disclosure. System 100 can comprise a storage component 102 that can store an ordered event stream (OES) 110, 111, etc., which can store representations of, reference to, etc., an event. An OES can store one or more events. An event can be associated with a key, e.g., a routing key. A key can typically be determined from an aspect or characteristic of, or corresponding to, an event, although other key determination techniques can be employed. As an example, a key can be based on a characteristic of the source of the event data, such as a customer identifier, machine identifier, a location of a device providing the event data, a type of a device providing the event data, etc. Events can be written to an OES in an ordered manner according to a key, e.g., events with a same key can be written to a same portion, e.g., segment, etc., of an OES in an ordered manner. Similarly, events can be read from an OES, generally in an ordered manner, according to a key, e.g., typically in the order in which they were previously written into a portion of an OES. A component(s) providing data for events to be written can be termed a 'writer(s),' e.g., a writer application instance, etc., and a component(s) requesting data from events can be termed a 'reader(s),' e.g., a reader application instance, etc. As such, a writer can provide data for an event that can be written to a portion of an OES, e.g., OES 110, 111, etc., in an ordered manner based on a key associated with the event. Similarly, a reader can receive data from an event stored in a portion of an OES, e.g., OES 110, 111, etc., based on a key.

Processor component 104 of a system 100 can receive write(s) 106 that can be written to OES 110, 111, etc., to be stored via storage component 102. Processor component 104 of a system 100 can provide access to events based on a key, e.g., as read(s) 107 that can be communicated to a reader. Generally, one processing instance, e.g., processor component 104, etc., can be designated for writing events to a portion, e.g., segment, of OES 110, 111, etc. OES 110, 111, etc., can comprise one segment and/or parallel segments that can store events according to a key. In an aspect, more than one processing instance writing to a segment of an OES, while allowable in some embodiments, is typically disfavored because it can increase the difficulty of writing incoming events in a properly ordered manner. However, a given processing instance can read, write, etc., to more than one OES segment, e.g., a given processing instance can write to one or more OESs, to one or more segments of one OES, to one or more segments of one or more OESs, etc. Generally, for a given number of segments there can typically be up to the same number of processing instances. Although adding more processing instances is allowable, these additional processing instances can generally be left idle to avoid possible scrambling of an order of events being written to a segment. It is further noted that idle processing instances, where comprised in system 100, for example, can act as reserve processing instances, such as to allow for failover where an active processing instance becomes less responsive, etc. In an aspect, keys of one or more segments of an OES can represent a key space for OES 110, 111, etc. Segments can therefore act as logical containers associated with a particular range of keys for an event stream and can be used to store events within an OES. When a new event is written to a stream, it can be stored to one of the segments based on the event key. In an aspect, the key space can be divided into a number of ranges that can correspond to the number of segments comprising an OES. As an example, a key space for an OES can be from 0 to 100, the OES can comprise two parallel segments wherein the first segment sequentially stores events with, for example, keys from 0 to 30 and the second segment sequentially stores events with keys from >30 to 100. In this example, a first event with a key of 54 can be appended to the second segment, a second event with a key of 29 can be appended to the first segment, a third event with a key of 14 can be further appended to the first segment after the second event, etc.

OES 110, as illustrated in system 100, can be a simplistic example of an OES that can comprise just one segment for storing incoming event write(s) 106 and sourcing event read(s) 107, and therefore the key space of OES 110 can be embodied in an example single segment with events that can have an origin terminus 112. A first event can be written at origin terminus 112. Subsequent events can then be appended at an additive terminus 114 that is typically at the head of the stream of written ordered events, e.g., a most recent event is written to the head of example OES 110, which can provide ordering of the events being written. This can result in example OES 110 allowing for continuous and unbounded data storage that can be a durable, elastic, append-only, unbounded sequence of events. As an example, a $(K+1)^{th}$ event can be appended to the $K^{th}$ event of example OES 110 at additive terminus 114. In an aspect, storage component 102 can store any number of OESs, e.g., OES 110, 111, etc. Moreover, any one OES can comprise any number of parallel segments, e.g., strings of events for a defined key space range. Each segment can comprise an ordered sequence of stored events. The key space of an OES can evolve, e.g., through different epochs, to comprise different numbers of OES segments as is disclosed elsewhere herein. The key space can be symmetrically or asymmetrically divided and can be, but is not required to be, contiguous.

In system 100, event frame component (EFC) 120 can facilitate reading of events based on a determined progress value, e.g., between a first time and a second time, up to an indicated count of events, or some other framing parameter, for events of a segment(s) of an OES(s). In an aspect, framing can indicate a window of readable events from a larger quantity of events to be read. In this aspect, framing can prevent a reading of events beyond the window and, as such, can allow for all readers of events in segments of an OES to catch up with each other before the readers are permitted to being reading events from a new window/frame. In an embodiment, a stream-cut event can act as a frame boundary. A stream-cut, hereinafter a 'cut,' cut event,' etc., can be an event indicating a progress position in the stream at an event boundary. In an aspect, cut events can be stored via a segment of an OES, e.g., corresponding to a stream-cut event key. A stream-cut event can indicate a progress position that can goes through all segments of a stream, e.g., a first cut can indicate a progress position applicable to all segments of a stream. In an aspect, stream-cuts can be employed for operations other than framing reads as disclosed herein, although such other uses are not herein disclosed for the sake of clarity and brevity, for instance, stream-cuts can be used as an argument for a stream truncation request to enable a system to delete events that are ahead of a given stream-cut, etc. In an aspect, a cut event can be generated automatically based on a selectable or determinable input value.

In an aspect, EFC 120 can generate, store, track, modify, delete, or perform other stream-cut event related operations. As an example, EFC 120 can generate cut events at every 1,000 event writes. This example can enable a reader to frame read operations based on multiples of the cut events, e.g., every 1000, 2000, 3000, etc., events. EFC 120 can further support tracking progress of a reader based on the cuts, for example, EFC 120 can indicate that readers are reading events in a frame bounded by the 5,000th event boundary such that the readers can be prevented from reading events beyond this example boundary until all readers have completed reading up to the 5,000th event, after which point, the example EFC 120 can indicate readers are reading events in a next frame bounded by the 6,000th event boundary to enable reading up to, but not beyond, the 6,000th event until all readers are caught up. In an aspect, frames can be periodic, for example every 1,000 milliseconds (msec). In another aspect, frames can be non-periodic, for example, at 10 msec, 18 msec, 500 msec, 612 msec, . . . , etc.

In an aspect, framing can enable a reader to read events according to a key up to a frame boundary. In this aspect, multiple readers can read events up to a frame boundary. As an example, a first reader can read events with a first key up to a first frame boundary and a second reader can read other events with a second key also up to the first frame boundary. In this example, permission for either reader to begin reading up to a second frame boundary can be predicated on both readers indicating reaching the first frame boundary. In an aspect, a group of readers can similarly be bounded by a cut event frame boundary, e.g., a group of readers reading a range of keys can be temporarily constrained by a designated frame boundary.

In an aspect, different readers can each employ different framing. As an example, a first and second reader can employ a first framing instance predicating advancement to next frames of the first framing instance based on the progress of the first and second readers, while contemporaneously third to sixth readers can employ a second framing instance predicating advancement to next frames of the second framing instance based on the progress of the third to sixth readers. In an aspect, contemporaneous framing can employ frame boundary occlusion, wherein different framing instances can employ a 'lowest common framing' to govern advancement of corresponding contemporaneous reads. As an example, a first framing instance have a frame boundary, e.g., stream-cut, every 100 msec and a second framing instance can have a frame boundary every 300 msec, such that readers employing the first and the second instance can each employ the first framing instance, e.g., every 100 msec, allowing EFC 120 to track advancement of the first framing instance rather than tracking both the first and the second framing instances. In this example, it would be improper to employ the second framing instance in lieu of the first framing instance because the frames would be 300 msec rather than the prescribed 100 msec., e.g., the more limiting framing instance can be employed typically without detriment. It is additionally noted that where an occlusion can be non-integer, other factors can be employed to determine the propriety of the framing occlusion, e.g., default condition can allow only integer occlusion, system administrator permission can be requested to permit non-integer occlusion, etc., an example of a non-integer occlusion can be a first framing instance occurring every msec and a second framing instance occurring every 7 msec because use of the 3 msec framing would result in a condition where reads could occur at 3, 6, 9, 12, 15, etc., msec which, in some conditions, not be appropriate for readers employing the second framing instance are looking for frame boundaries at 7, 14, 21, etc., msec.

Figure 2:
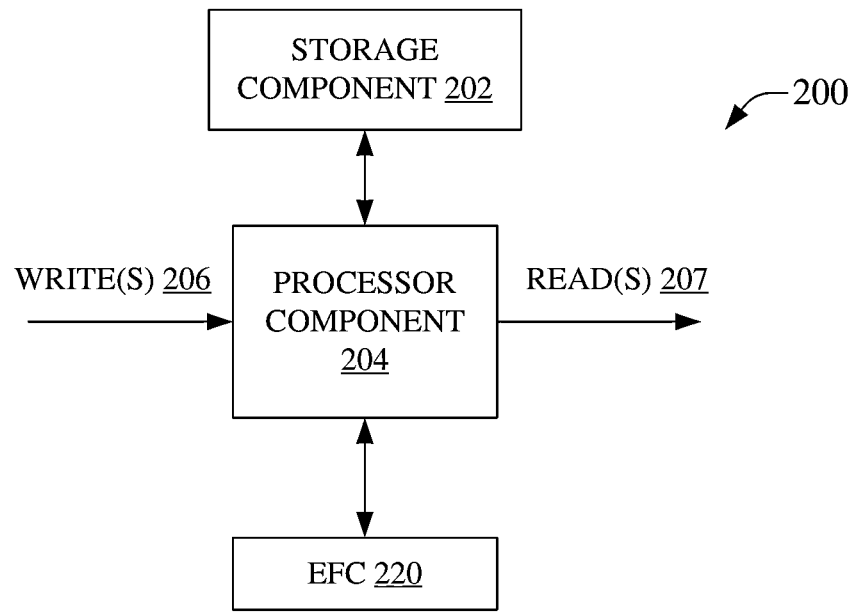
FIG. 2 is an illustration of an example system enabling framed event access across one or more segments of an ordered event stream, in accordance with aspects of the subject disclosure.
Figure 2:
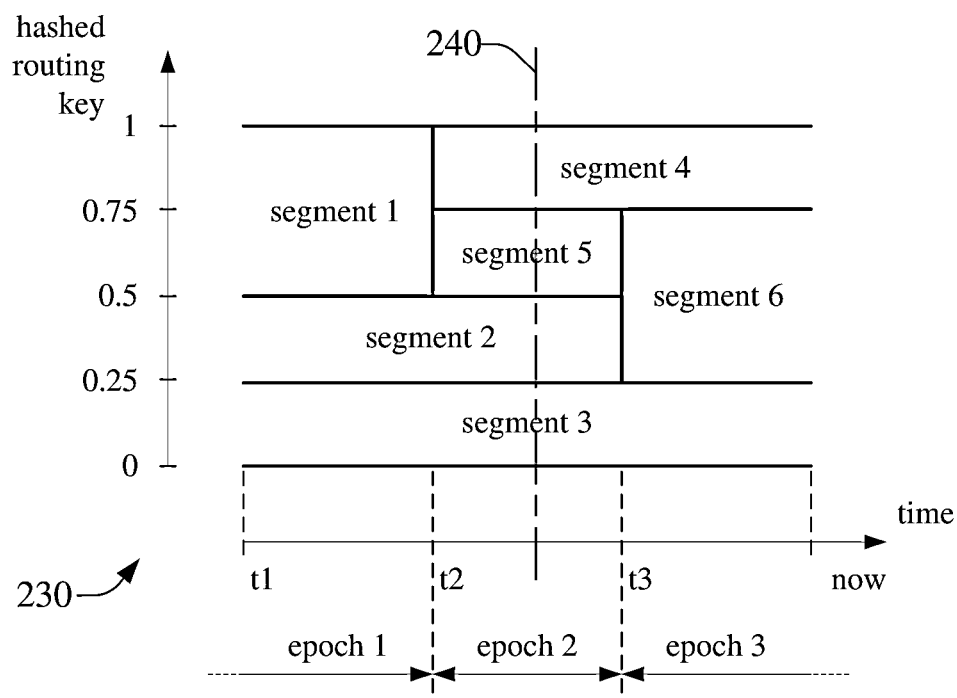

FIG. 2 is an illustration of an example system 200 enabling framed event access across one or more segments of an ordered event stream, in accordance with aspects of the subject disclosure. System 200 can comprise a storage component 202 that can store an OES that can store one or more events according to a routing key that can be determined from aspects of the event. Events can be written to an OES in an ordered manner, e.g., via write(s) 206, and can be read from the OES in an ordered manner, e.g., via read(s) 207. In an aspect, keys of one or more segments of an OES can represent a key space. Segments can therefore act as logical containers associated with a particular range of keys for an event stream and can be used to store events within an OES.

Ordered event stream system 200 can comprise segments. At a first time, for example at t1 of 230, OES system 200 can comprise one or more parallel segments, e.g., segment 1, segment 2, segment 3, etc. At some point a segment can be scaled. As an example, at t2 of 230, segment 1 can be scaled up. This can result in causing segment 4 and segment 5 and correspondingly sealing segment 1. The topology of the OES, illustrated at 230, comprising segments 1-3 pre-scaling can be designated as epoch 1. Similarly, the topology of the OES comprising segments 4-5 and 2-3 can be designated as epoch 2, also as illustrated at 230.

In an aspect, segments 2 and 3 are continuous across epochs 1 and 2 while segment 1 ends at the transition from epoch 1 to 2. In an aspect, in epoch 1, events associated with a key between 0.5 and 1, e.g., 0.5>key≥1, can be written (and read from) segment 1, while in epoch 2, events associated with a key between 0.75 and 1, e.g., 0.75>key≥1.0, can be written (and read from) segment 4 and events associated with a key between 0.5 and 0.75, e.g., 0.5>key≥0.75, can be written (and read from) segment 5. As such, access to events for a given key can be associated with reads in different epochs. As an example, reading an event with a key of 0.8 can read from both segment 1 and segment 4. Where the read is from head to tail, the read of example events with a key of 0.8 can begin reading in segment 4 and then continue reading into segment 1 across the epoch boundary between epoch 2 and 1. Similarly, where the read is from tail to head, events associated with the example key of 0.8 can begin in segment 1 and continue into segment 4 across the epoch boundary. However, it is noted that generally no additional events are written into segment 1 after the scaling event is committed and a new epoch is begun.

In epoch 2 at 230, the topology of OES system 200 can comprise segments 4-5 and 2-3. Further scaling can be later undertaken, e.g., at t3 of 230. OES system 200 can, for example, scale down by condensing segment 2 and 5 into segment 6 at t3, that is, segments 2 and 3 can be sealed and segment 6 can be created. This example scaling down can reduce a count of segments comprising OES system 200. The scaling at t3 of 230 can result in ending epoch 2 and beginning epoch 3. As such, in epoch 3, the topology of the OES comprising segments 3-4 and 6 post-scaling in 230 can distribute the key space of OES system 200, for example, as 0≤segment 3>0.25, 0.25>segment 6≥0.75, and 0.75>segment 4≥1.0.

In system 200, event framing component (EFC) 220 can facilitate framing event reads from segment(s) of an OES stored via storage component 202. In an aspect, EFC 220, as shown in 230, can designate stream-cut event 240 as an event reading frame boundary. Accordingly, event read(s) 207 can be permitted to occur up to stream-cut event 240. In an aspect, where more than one reader and/or group of readers are performing reads comprised in read(s) 207, for each reader and/or group of readers EFC 220 can deny permission to read events occurring after stream-cut event 240. In this regard, as each reader and/or group of readers completes reading events up to stream-cut event 240, EFC 220 can effectively cause those readers to suspend further reads until all other readers and/or groups of readers catches up to stream-cut event 240. In an embodiment, EFC 220 can generate stream-cut event 240. In another embodiment, EFC 220 can employ stream-cut event 240 that can be generated by another component of system 200 or a device designating stream-cut event 240 for system 200.

Figure 3:
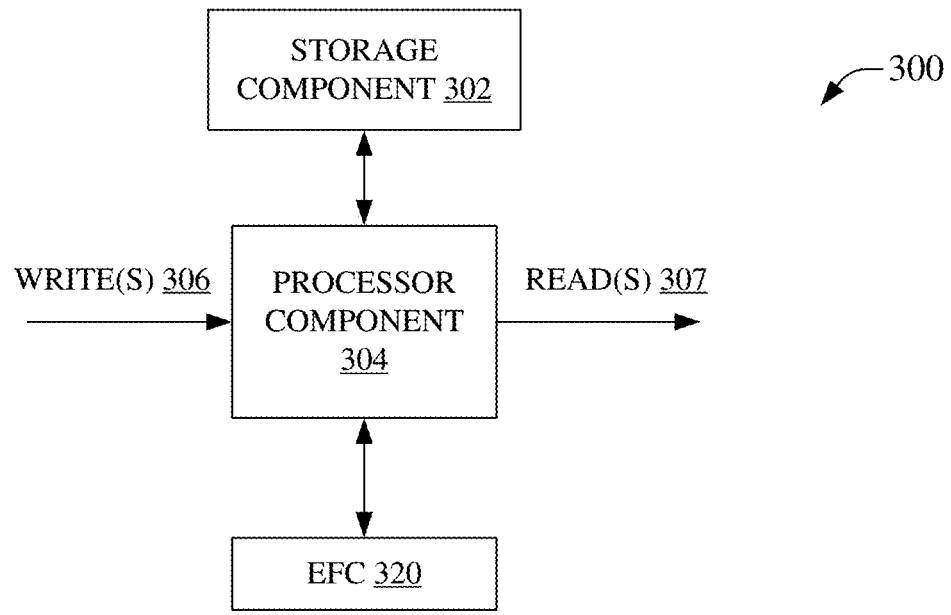
FIG. 3 illustrates an example system that can enable framed event access to an event based on a stream cut event traversing one or more segments of an ordered event stream, in accordance with aspects of the subject disclosure.
Figure 3:
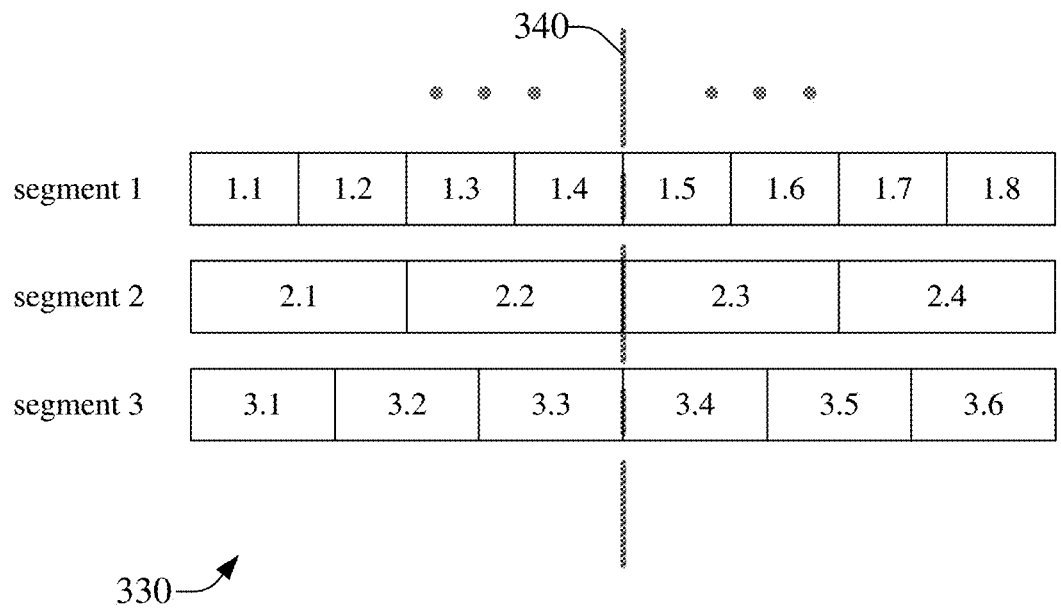

FIG. 3 is an illustration of a system 300, which can facilitate framed event access to an event based on a stream cut event traversing one or more segments of an ordered event stream, in accordance with aspects of the subject disclosure. System 300 can comprise a storage component 302 that can store an OES that can store one or more events according to a routing key that can be determined from aspects of the event. Events can be written to an OES in an ordered manner, e.g., via write(s) 306, and can be read from the OES in an ordered manner, e.g., via read(s) 307. In an aspect, keys of one or more segments of an OES can represent a key space. Segments can therefore act as logical containers associated with a particular range of keys for an event stream and can be used to store events within an OES. Ordered event stream system 300 can comprise segments.

In an aspect, system 300 can store events according to segments, for example, as illustrated at 330. A stream-cut event 340 can be employed by EFC 320 to define an event reading frame boundary. As such, cut 340 can be applicable in some, none, or all segments of an OES stored via system 300. As is illustrated at 330, an OES can comprise segment 1, 2, and 3, such that cut 340 can define an event reading frame boundary for event 2, and between events 3.3 and 3.4 of segment 3. In contrast to unframed reading of events, framed event reads for readers reading from segments 1-3 based on corresponding key values, cut 340 can enable delaying one or more of said readers until all readers have reached cut 340. An example event write sequence can be, for example, 1.1, then 3.1, then 1.2 and 2.1, then 3.2, then 1.3, then 1.4 and 2.2 and 3.3, then 1.5, then 3.4, then 1.6 and 2.3, then 1.7, then 1.8 and 2.4 and 3.6, as illustrated at 330. Where events can be read out by readers at one event per second, segment 2 in this example can be fully read out while segment 1 is yet only half read out, resulting in the second half of segment 1 being significantly displaced in comparison to the writing order. Similarly, segment 3 can be read out well before reading of segment one is completed in this example. Reading out without framing can result in a readout order of: 1.1 and 2.1 and 3.1, then 1.2 and 2.2. and 3.2, then 1.3 and 2.3, and 3.3, then 1.4 and 2.4 and 3.4, then 1.5 and 3.5, then 1.6 and 3.6, then 1.7, then 1.8, which sequence can be highly perturbed in contrast to the wiring order. However, by applying framing, less perturbation can occur, more especially over long segment readout sequences, e.g., the sequence perturbation can be contained within each reading frame. As an example, employing cut 340, the above example readout sequence can instead be: 1.1 and 2.1 and 3.1, then 1.2 and 2.2 and 3.2 at which point segment 2 can be at cut 340 resulting in reading of segment 2 being constrained by EFC 320, e.g., permission to conduct further reading of segment 2 can be denied by EFC 320. As such, the other readers can continue reading while the reader for segment 2 can be 'paused' at cut 340. Accordingly, the example readout sequence can next comprise 1.3 and 3.3, and segment 3 can then reach cut 340 and can be correspondingly constrained. The example sequence can then read 1.4. At this point in the example, all readers can have reached cut 304 and EFC 320 can then permit the readers to advance to a next reading frame boundary, e.g., 1.5, 2.3 and 3.4, then 1.6, 2.4, and 3.5, then 1.7 and 3.6, then 1.8. As such, the framed readout can be 1.1 and 2.1 and 3.1, 1.2 and 2.2 and 3.2, 1.3 and 3.3, 1.4, 1.5 and 2.3 and 3.4, 1.6 and 2.4 and 3.5, 1.7 and 3.6, and then 1.8.

While the framed readout sequence can still be different than the write sequence, the difference between the write/read sequences can be less for framed readouts than for unframed readouts. This reduced sequence perturbation resulting from framed reading can be more pronounced where segments can contain many events, can have more substantial differences in event frequencies, there are more substantial differences in reader speeds, network delays resulting from distributed storage components results in differences in readout speeds between readers, or numerous other conditions relevant to use of parallel segments for an OES in a cluster-based storage system that can be geographically diverse. As an example, network delays for reading events from a data store in London can be different than reading events from a data store in Cape Town, which can result in reading the London events much faster than the Cape Town events. In this example, by framing the readouts, the differences between the readout speeds can be confined to each frame and less sequence perturbation can occur in the framed, vs. unframed, readout, that is, the slower reader can be allowed to 'catch up' to the faster reader at each frame rather than allowing the faster reader to complete all of the reading well ahead of the slower reader.

Figure 4:
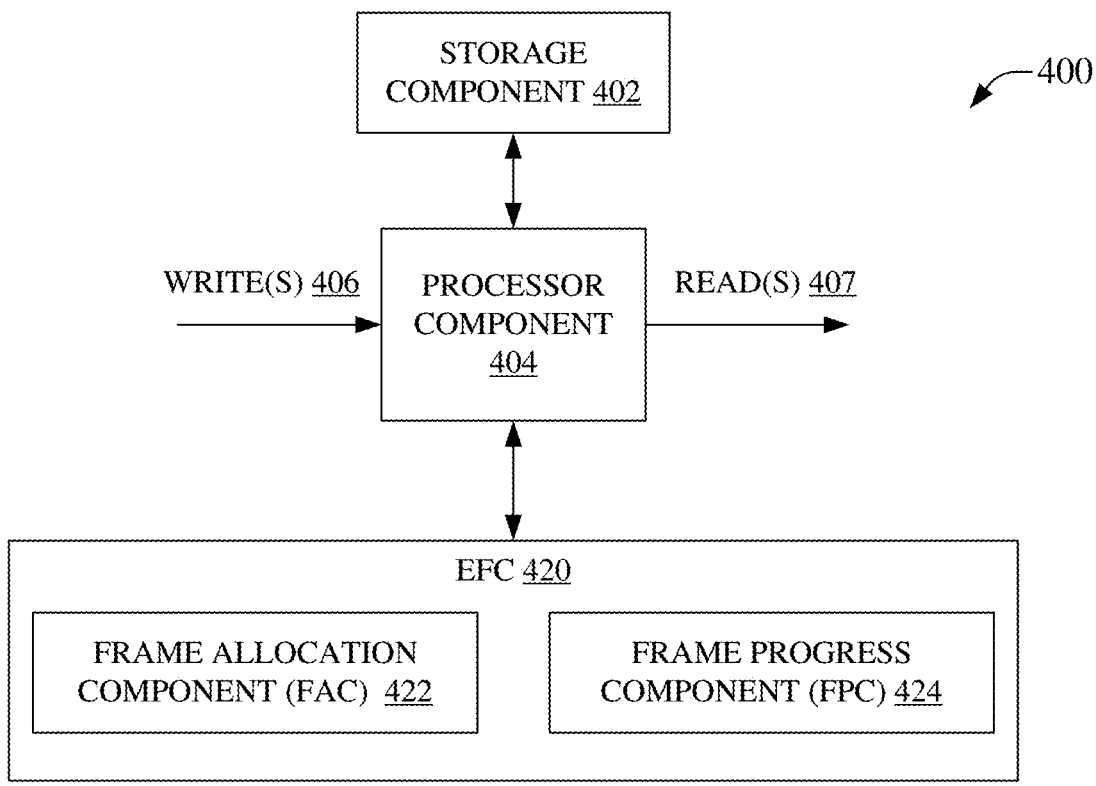
FIG. 4 is an illustration of an example system facilitating framed event access for one or more reader components accessing one or more segments of an ordered event stream, in accordance with aspects of the subject disclosure.
Figure 4:
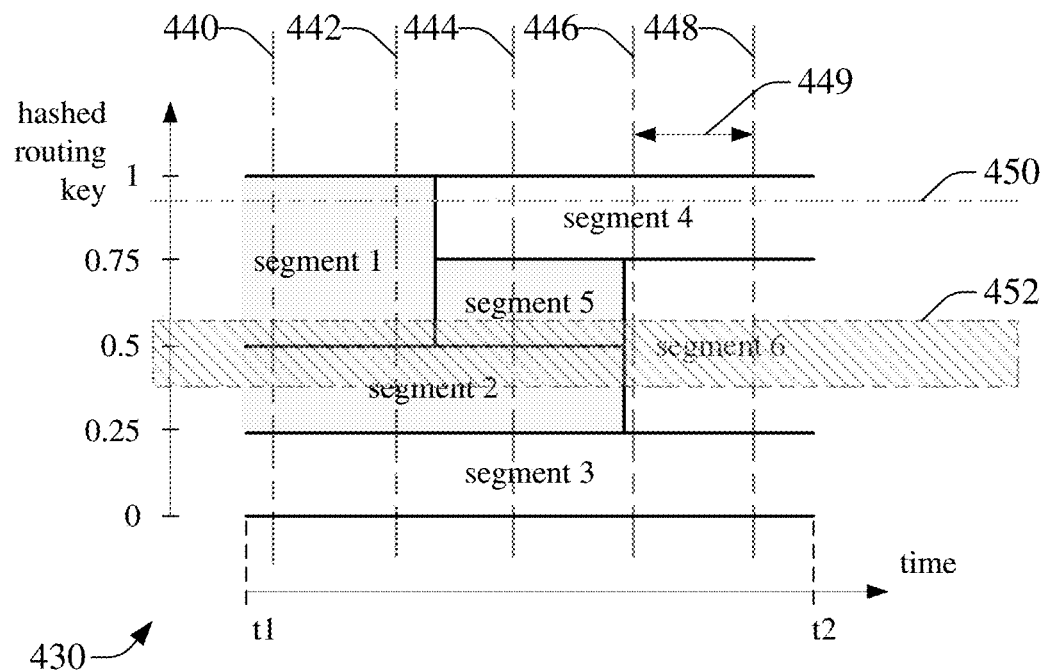

FIG. 4 is an illustration of an example system 400, which can enable framed event access for one or more reader components accessing one or more segments of an ordered event stream, in accordance with aspects of the subject disclosure. System 400 can comprise a storage component 402 that can store an OES that can store one or more events according to a routing key that can be determined from aspects of the event. Events can be written to an OES in an ordered manner, e.g., via write(s) 406, and can be read from the OES in an ordered manner, e.g., via read(s) 407. In an aspect, keys of one or more segments of an OES can represent a key space. Segments can therefore act as logical containers associated with a particular range of keys for an event stream and can be used to store events within an OES. Ordered event stream system 400 can comprise segments.

In an aspect, system 400 can store events according to segments, for example, as illustrated at 430. Stream-cut event(s) 440-448 can be employed by EFC 420 to define event reading frame boundary(ies). In an aspect, EFC 420 can comprise frame allocation component (FAC) 422 that can allocate a frame boundary value, for example, allocating a stream-cut event as a frame boundary, generating a frame boundary, etc. EFC 420 can, in an aspect, comprise frame progress component (FPC) 424 that can facilitate employing a frame, e.g., a frame boundary, to control advancement, progress, operation, etc., of one or more reader, one or more groups of readers, etc. In an embodiment, FAC 422 can generate frames having boundary values that can be employed by FPC 424 to control permissions for reader(s)/group(s) to read portions of segment(s) of stream(s).

As is illustrated at 430, an OES can comprise segments 1 to 6 for a key space from zero to one. It is noted that epoch boundaries exist but are not expressly called out for the sake of clarity and brevity, but can be appreciated based on illustration 230 of FIG. 2. In an aspect, a frame can extend to a first frame boundary, which can typically be from a second frame boundary, a beginning of a stream/segment, from a determined progress point corresponding to a read operation, etc. As an example, a frame can extend from just after frame boundary 446 up to and including frame boundary 448, e.g., frame 449. As another example, a frame can extend from a start of the OES illustrated in 430 to frame boundary 440.

Also as illustrated at 430, a reader can read events corresponding to one or more key values. As an example, a reader can read events at 450, e.g., reading events from segment 1 across the epoch boundary and into segment 4 for a key value that can be approximately 0.9. As another example, a reader(s)/group(s) can read events from the shaded area of 452 that can roughly correspond to event keys between 0.4 and 0.6 and that can be comprised in segments 1, 5, and 6 and can also be comprised in segments 2 and 6 between progress points t1 and t2.

Figure 5:
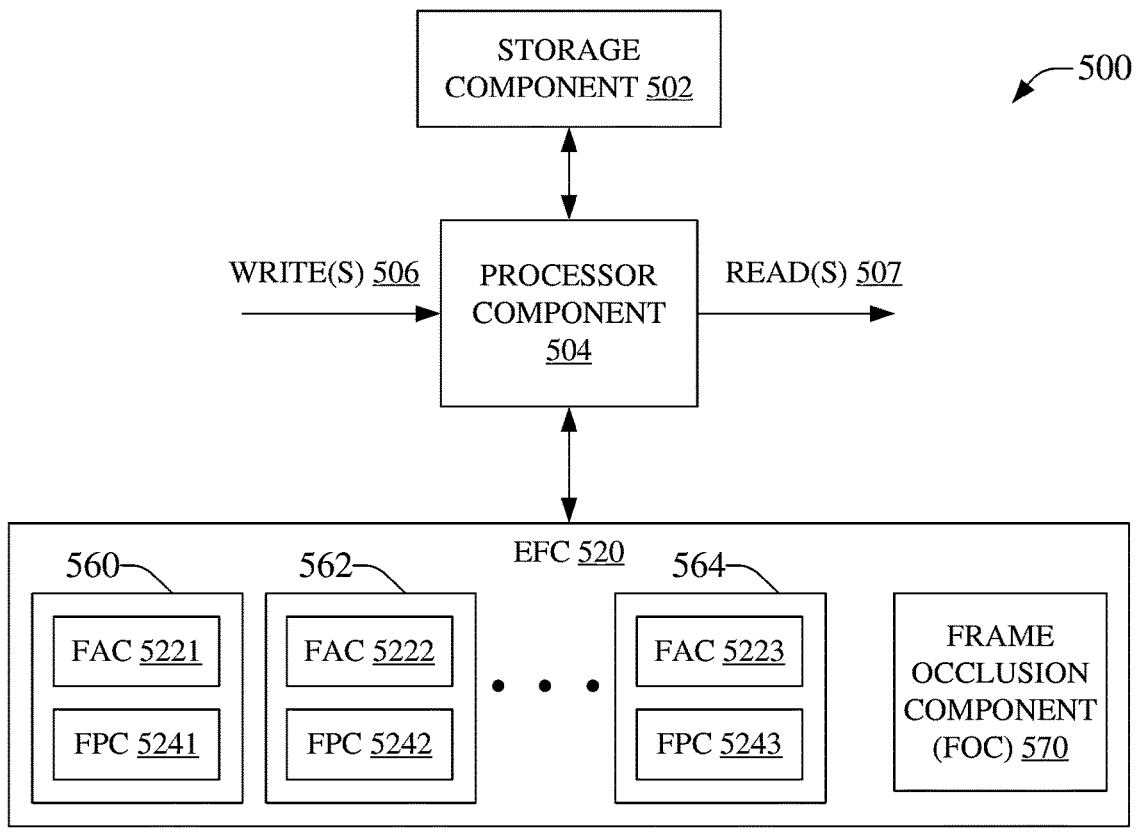
FIG. 5 is an illustration of an example system that can facilitate contemporaneous framed event access according to one or more frame schemes, in accordance with aspects of the subject disclosure.
Figure 5:
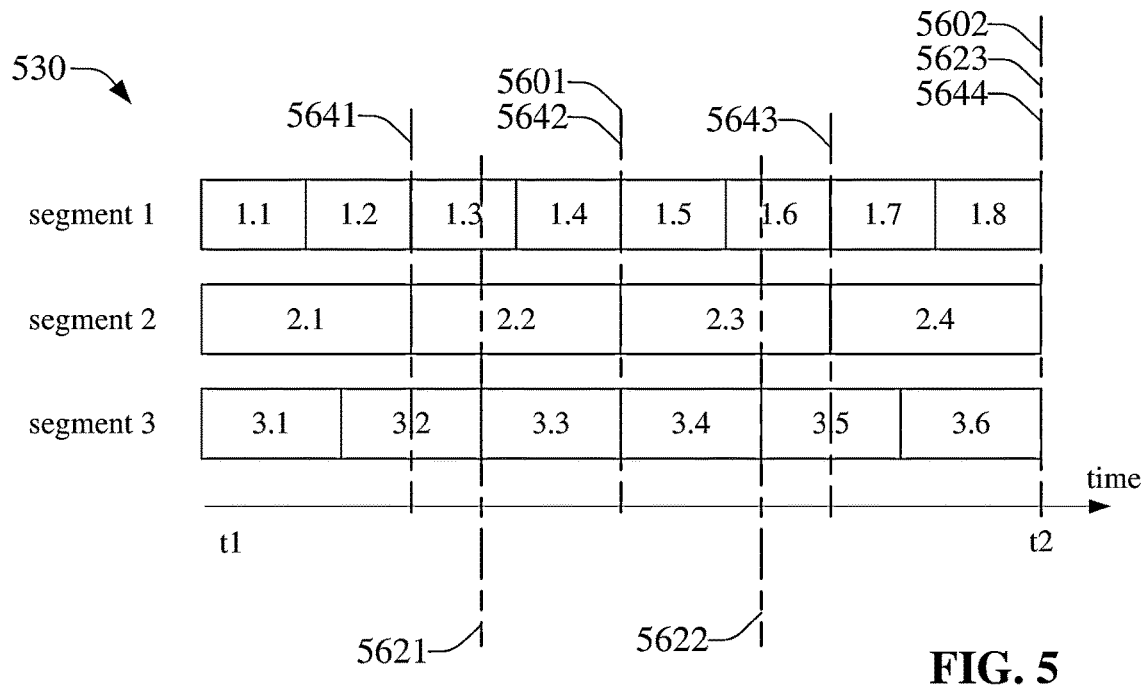

FIG. 5 is an illustration of a system 500 that can facilitate contemporaneous framed event access according to one or more frame schemes, in accordance with aspects of the subject disclosure. System 500 can comprise a storage component 502 that can store an OES that can store one or more events according to a routing key that can be determined from aspects of the event. Events can be written to an OES in an ordered manner, e.g., via write(s) 506, and can be read from the OES in an ordered manner, e.g., via read(s) 507. In an aspect, keys of one or more segments of an OES can represent a key space. Segments can therefore act as logical containers associated with a particular range of keys for an event stream and can be used to store events within an OES. Ordered event stream system 500 can comprise segments.

In an aspect, system 500 can store events according to segments, for example, as illustrated at 530. Stream-cut event(s) 5641, 5601, . . . , 5623, 5644, etc., can be employed by EFC 520 to define event reading frame boundary(ies). In an aspect, EFC employ framing groups 560, 562, 564, etc., to support framing operations for different groups of readers accessing stream storage system 500. In an embodiment, a framing group can comprise an instance of a frame allocation component and a frame progress component, e.g., framing group 560 can comprise FAC 5221 and FPC 5241, framing group 562 can comprise FAC 5222 and FPC 5242, framing group 564 can comprise FAC 5223 and FPC 5243, etc. Each framing group can separately support one or more readers and/or one or more reader groups that can read from segments of streams stored via system 500. In an aspect, the framing groups can support contemporaneous frame controlled reading. As an example, a first data consumer can correspond to a first framing group and a second data consumer can correspond to a second framing group such that each data consumer can receive data read out according to different framing parameters, such as the first data consumer framing applying to one or more different segments of a stream than for the second data consumer framing, the first data consumer having a different tolerance for out of sequence data than the second data consumer and therefore the corresponding framings having different periodicity, etc. As such, in an aspect, there can be conditions in which some framing instances can have some level of overlap in frame boundaries being created, tracked, etc. As an example, framing 560 can employ frame boundaries every 100 seconds and framing 561 can employ boundaries every 1000 seconds. In this example, every ten frame boundary advances for framing 560 can be the same as, or similar to, one frame advance for framing 561.

In an aspect, EFC 520 can comprise frame occlusion component (FOC) 570, FOC 570 can enable use of frame boundaries between framing groups, for example boundaries of a first framing group can be employed by a second framing group. Using the above example, where framing 560 can employ frame boundaries every 100 seconds and framing 561 can employ boundaries every 1000 seconds, framing 561 can be treated as a multiple of framing 560, e.g., for every ten frame boundary advances corresponding to framing 560, one frame advance can be applied for framing 561. This can reduced the computational load associated with numerous framing group iterations. In an aspect, FOC 570 can be understood to leverage a determination of a 'lowest common framing' to govern advancement of corresponding contemporaneous reads. As is noted elsewhere herein, an occlusion can be non-integer and therefore other factors can be employed to determine the propriety of a framing occlusion. As examples, a default condition can allow only integer occlusion, a permission/indication can be used to permit non-integer occlusion, etc., An example of a non-integer occlusion can be a first framing instance occurring every msec and a second framing instance occurring every 7 msec whereby the 3 msec framing would result reads at 3, 6, 9, 12, 15, etc., msec which, in some conditions, can be inappropriate for readers employing the 7 msec framing looking for frame boundaries at 7, 14, 21, etc., msec. However, in this example, some other conditions can be appropriate, e.g., reading at 3, 6, 9, 12, 15, 18, 21, 24, 27, 30, 33, 36, 39, 42, etc. for the 3 msec and 7 msec can be acceptable where the 7 msec framing is acceptable at the bolded readings, 9, 15, 21, 30, 36, and 42 msec rather than at 7, 14, 21, 28, 35, and 42 msec.

At 530, example frame boundaries can for framing group 560 can be at 5601, and 5602. Similarly for example, frame boundaries can for framing group 562 can be at 5621, 5622, and 5623. Further, frame boundaries can for framing group 564 can be at 5641, 5642, 5643, and 5644. As such, readers corresponding to each framing group 560-564 can perform framed reading of events in example segments 1 to 3 illustrated at 530. As an example, readers corresponding to framing group 562 can read up to 5621, pause, and then read up to 5622, pause again, then read up to 5633, resulting in reading a sequence that can be 1.1 and 2.1 and 3.1, then 1.2 and 2.2. and 3.2, then pausing reading of segments 2 and 3, e.g., at 5621, then reading 1.3. At this point in the example, all readers have read up to 5621 and FPC 5242 can permit reading up resume up to 5622 whereby, events 1.4 and 2.3 and 3.3 are read next, then reading of segment 2 is paused for reaching 5622, then 1.5 and 3.4 are read and reading of segment 3 is then paused for reaching 5622, followed by reading of 1.5, then 1.6, at which point all readers have read up to 5622 and FPC 5242 can advance to 5623, which can correlate to then reading 1.7 and 2.4 and 3.5, then 1.8 and 3.6. Similar examples are not disclosed for the sake of clarity and brevity in relation to framing group 560 for frame boundaries 5601 and 5602, and for framing group 564 for frame boundaries 5641 to 5644, although all such examples are within the scope of the instant disclosure.

The illustration at 530 can illustrate frame occlusion. In an aspect, frame boundaries 5641 to 5644 can be integer occlusive of frame boundaries 5601 and 5602. This can be appreciated in that 5642 can occlude 5601 and that 5644 can occlude 5602. As such, framing group 560 can be said to be occluded by farming group 562 and the framing boundaries 5641 to 5644 can be substituted for framing of readers of framing group 560. This substitution can reduce the computing resource burden of separately creating cuts 5601, 5602, 5641, 5642, 5643, and 5643, and tracking reader progress corresponding to those frame boundaries by rather creating cuts 5641 to 5644 and tracking progress for readers of framing group 560 and 564 in relation to 5641 to 5644. Similarly, integer occlusion can be observed between framing group 560 and 562, and also for framing group 562 and 564.

Figure 6:
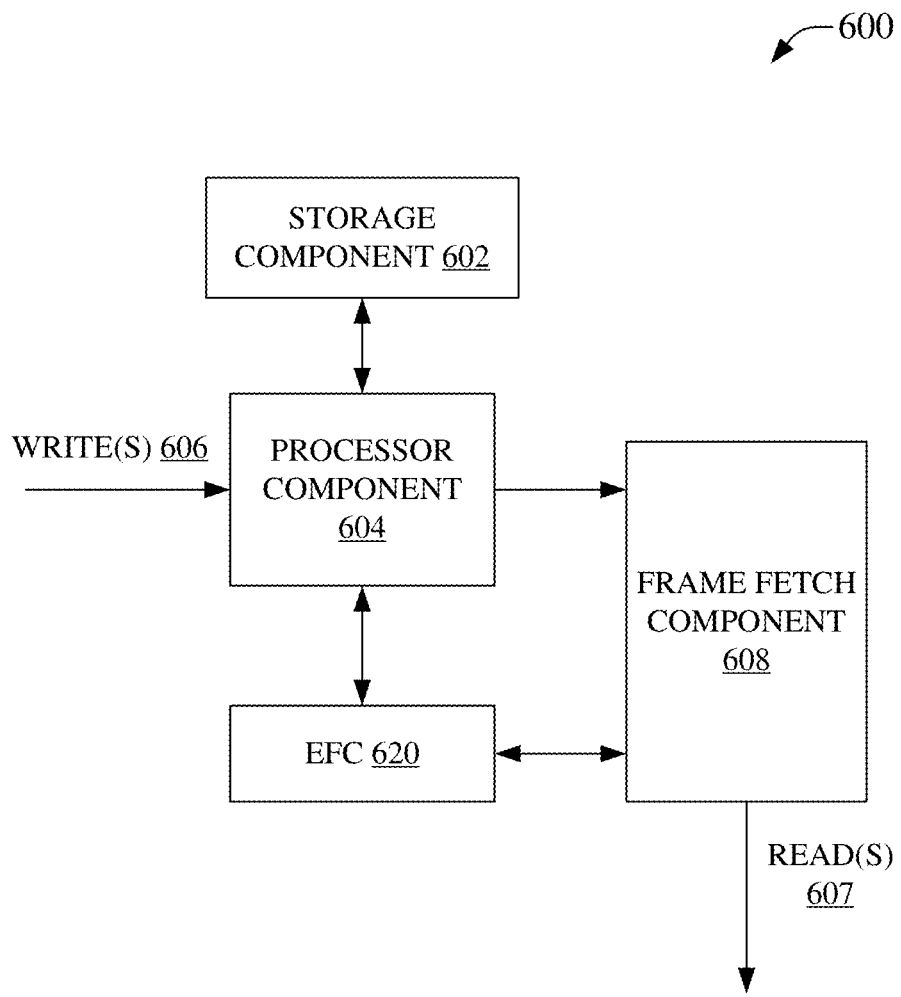
FIG. 6 is an illustration of an example method enabling prefetching for framed event access in an ordered event stream, in accordance with aspects of the subject disclosure.

FIG. 6 is an illustration of a system 600 that can facilitate prefetching for framed event access in an ordered event stream, in accordance with aspects of the subject disclosure. System 600 can comprise a storage component 602 that can store an OES that can store one or more events according to a routing key that can be determined from aspects of the event. Events can be written to an OES in an ordered manner, e.g., via write(s) 606, and can be read from the OES in an ordered manner, e.g., via read(s) 607. In an aspect, keys of one or more segments of an OES can represent a key space. Segments can therefore act as logical containers associated with a particular range of keys for an event stream and can be used to store events within an OES. Ordered event stream system 600 can comprise segments. Reading of events from the segment(s) of a stream can be subject to framing via EFC 620.

In an aspect, 'pausing' readers to allow other readers to catch up in an effort to better preserve event sequence can result in idle processor instances, e.g., a processor can idle while it waits for other readers to catch up. This can introduce some level of inefficiency. In an aspect, this inefficiency can be countered by 'buffering' or 'caching' of read data. As such, data from readers can be passed to frame fetch component 608 without framing, which can act to cache a portion of a stream, e.g., data can be 'replicated' from the OES into fame fetch component 608 in a manner that can preserve the ordering in the constituent segments of the OES. Thereafter, EFC 620 can frame events in frame fetch component 608. In an aspect, the speed differences of readers in system 600 can be experienced when fetching events into frame fetch component 608, however, in some embodiments, frame fetch component 608 can then facilitate access to the 'replicated' event cache without the speed differences and framing can be applied to group events within frame boundaries as has been described at length elsewhere herein. As such, rather than throttling readers across a potentially widely distributed storage system that can have storage in various countries, states, cities, communication networks/frameworks, etc., data can be collected at a 'local' cache, e.g., frame fetch component 608, which can then be subject to framing via EFC 620, to better preserve event readout sequence. It is noted that EFC 620 can also interact with processor 604 to apply framing to events being cached by frame fetch component 608, e.g., in some conditions, such as very substantial differences in segment size, throttling of readers reading events into frame fetch component 608 can be beneficial. As an example, a segment on a local data storage device can have faster event access than data from a server in Antarctica, such that it can be more efficient to frame data via EFC 620 by locally accessing events within a frame, with little to no use of frame fetch component 608, to coincide with events received for the same frame from Antarctica. As a contrasting example, reading form segments across inter-city data stores can have just enough delay that can become inefficient to repeatedly throttle up and throttle down processors, e.g., the processors can be 'nagged' by readers because the delay is just long enough to have the processor throttle up just after it had throttled down but that there is not enough delay to allow a processor to either throttle down or simply stay throttled up. In this example, frame fetch component 608 can allow events to be cached ahead of the frame boundaries, e.g., potentially entire streams/segments can be fetched to frame fetch component 608 at full processor speed, such that framing can then be applied at frame fetch component 608, typically with processors running at much more similar speeds.

Figure 7:
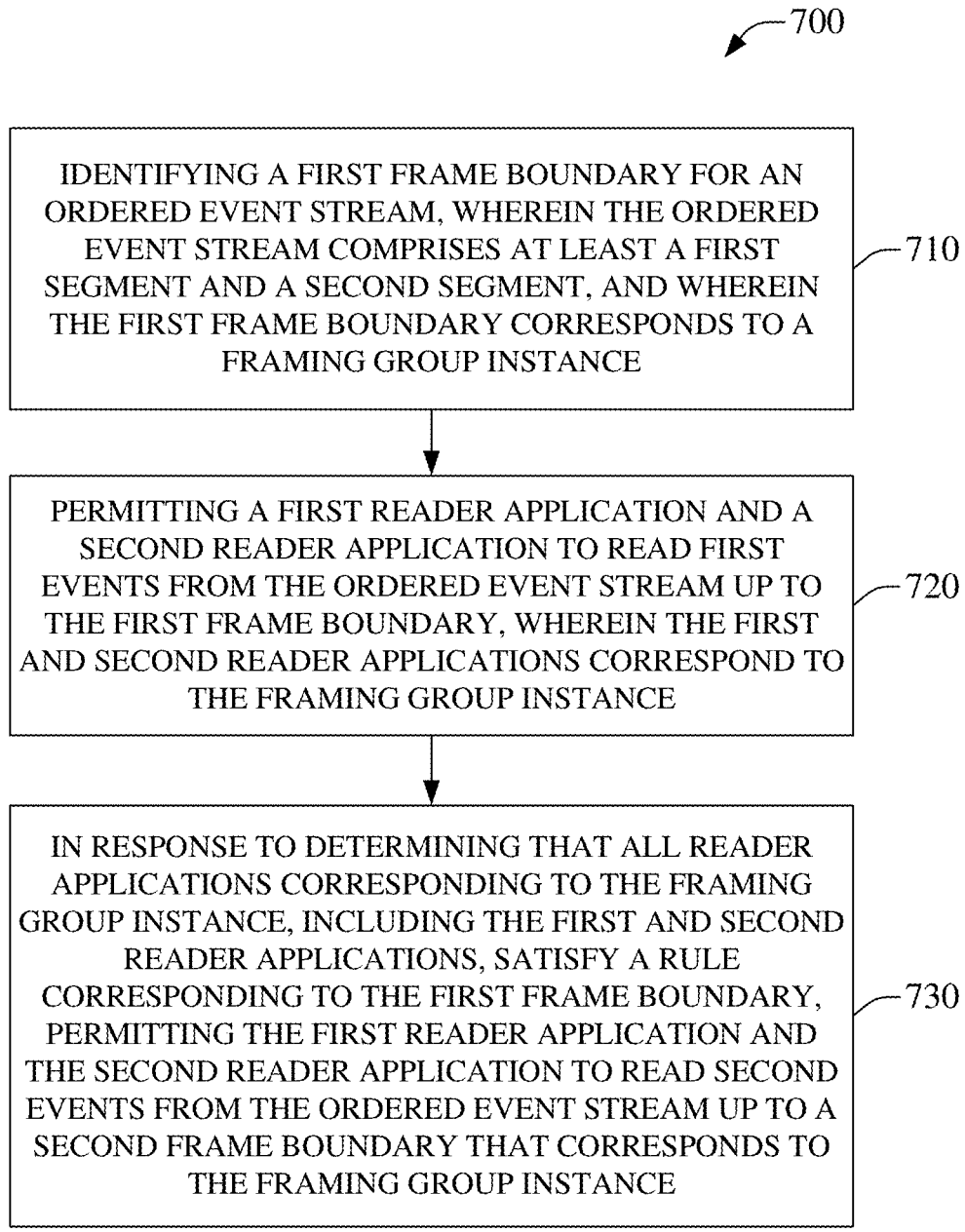
FIG. 7 is an illustration of an example method facilitating framed event access for one or more reader components accessing one or more segments of an ordered event stream, in accordance with aspects of the subject disclosure.
Figure 8:
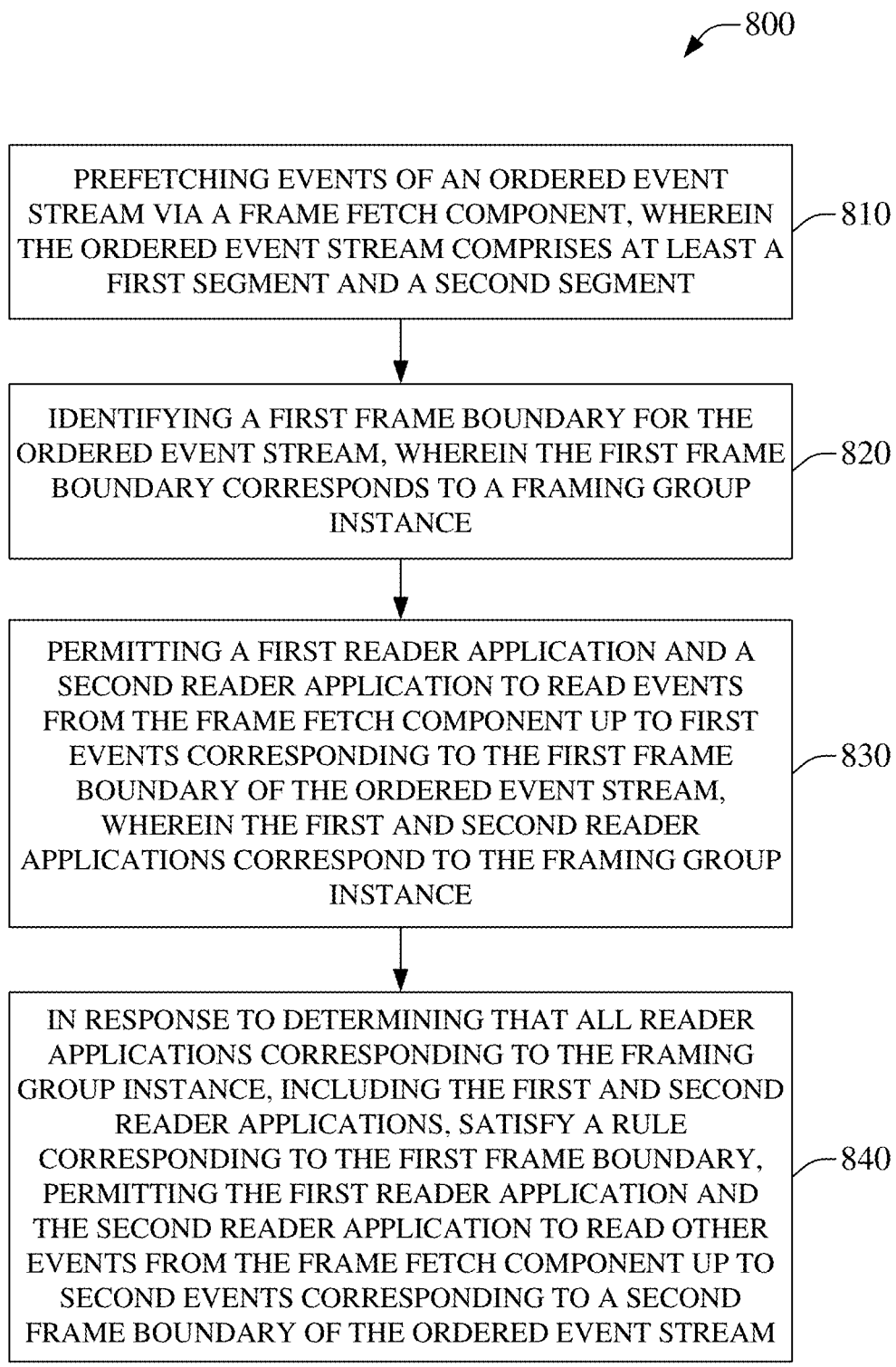
FIG. 8 is an illustration of an example method facilitating prefetching for framed event access in an ordered event stream, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described.

It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700 that can facilitate framed event access for one or more reader components accessing one or more segments of an ordered event stream, in accordance with aspects of the subject disclosure. At 710, method 700 can comprise identifying a first frame boundary for an ordered event stream, wherein the ordered event stream comprises at least a first segment and a second segment, and wherein the first frame boundary corresponds to a framing group instance. In an aspect, a stream-cut event, an event indicating a progress position in the stream at an event boundary, can be used as a frame boundary. In an embodiment, a frame boundary can be determined by an OES system, e.g., 100-600, etc., processors component, e.g., 104-604, etc., by an event frame component (EFC), e.g., EFC 120-602, etc., or can be communicated to an EFC from another component that can be local to or remote from an OES system. In an aspect, a frame boundary can be periodic or non-periodic. A frame boundary can apply to one or more segments of one or more streams of an OES system. As an example, a at 230 of FIG. 2, line 240 can indicate a frame boundary that can cross segments 4, 5, 2 and 3, effectively applying to all key values between 0 and 1 for the segments comprising an OES stored via system 200.

At 720, method 700 can comprise permitting a first reader application and a second reader application to read first events from the ordered event stream up to the first frame boundary, wherein the first and second reader applications correspond to the framing group instance. In an aspect, a frame can extend between frame boundaries, for example frame 449 in FIG. 4 can extend between frame boundary 448 and frame boundary 449. Events can be read by one or more reader applications, or one or more groups thereof, and can be constrained via an EFC, e.g., EFC 120-620, etc., according to frames, e.g., frame 449, etc. As an example, at 720, method 700 applied in system 400 can read events in segment 1 between frame boundaries 440 and 442 along line 450, e.g., line 450 can indicate a reader application traversing events of a key value of approximately 0.9 in illustration 430. Similarly, for shaded area 452, one or more other readers, e.g., a group of readers comprising a second reader, can read events with keys between about 0.4 and about 0.6 between frame boundaries 440 and 442. In an aspect, reading along 450 can occur at a different rate than along 452. As such, left unframed, a reader along 450 can read events out, for example, far ahead of a reader along 452, resulting in the readout sequence being increasingly dissimilar to the sequence the events were written. The departure between writing sequence and reading sequence across different routing key values can be reduced by intermittently allowing slower readers to catch up to faster readers, which can be enabled by framing as disclosed herein.

At 730, method 700 can comprise, in response to determining that all reader applications corresponding to the framing group instance, including the first and second reader applications, satisfy a rule corresponding to the first frame boundary, permitting the first reader application and the second reader application to read second events from the ordered event stream up to a second frame boundary that corresponds to the framing group instance. At this point method 700 can end. In an aspect, where a first reader reaches the first frame boundary, reading by the first reader can be suspended until other readers catch up, e.g., all reader applications, including the first and second reader applications, can be determined to satisfy a rule corresponding to the first frame boundary before the readers are permitted to read beyond the frame boundary, e.g., up to a second frame boundary. Returning to the example of system 400, at 430, where reading along 450 and 452 is proceeding between frame boundary 440 and 442, neither reader can be permitted to read beyond frame boundary 442 until the readers are all at frame boundary 442, e.g., if reader 450 arrives at boundary 442 first, it can be suspended until reader 452 also arrives at boundary 442, at which point both reader 450 and 452 can be permitted to advance as far as boundary 444. This can be repeated to cause readers to pause until other readers catch up at each of frame boundaries 440, 442, 444, 446, 448, etc.

FIG. 8 is an illustration of an example method 800, which can enable prefetching for framed event access in an ordered event stream, in accordance with aspects of the subject disclosure. At 810, method 800 can comprise prefetching events of an ordered event stream via a frame fetch component, wherein the ordered event stream comprises at least a first segment and a second segment. In some OES systems, e.g., OES system 100-600, etc., prefetching of events can be employed to improve consumption of computing resources, e.g., prefetching can be employed to replicate events from OES segments via reader applications that can have disparate performance characteristics into a cache, e.g., frame fetch component 608, etc. In an aspect, events can be cached beyond a frame boundary, for example, in system 400, at 432, events along line 450 can be cached between 440 and, for example, 448. In this example, where caching the vents occurs more quickly than reading events along 452, the processor reading along 450 can be released for a first time and until it can be needed to resume reading at 448. This first time can be longer than a second time that could occur if the first reader along 450 was paused at 442 to wait for the reader along 452 to catch up. In an aspect, the example reader at 450 can read to a cache then be released to perform other processes rather than just being intermittently released for shorter periods of time at each frame boundary to wait for the reader at 452 to catch up. Similarly, the reader at 452 can cache events. As such, events of segments can be cached/replicated at a frame fetch component. The cached events from the one or more segments can then be subjected to framing. Accordingly, prefetching of events to frame fetch component can improve consumption of computing resources, e.g., make reading more efficient by allowing processors to gather events prior to employing framing to compartmentalize sequencing disparities of cached events.

Method 800, at 820, can comprise identifying a first frame boundary for the ordered event stream, wherein the first frame boundary corresponds to a framing group instance. As has been noted elsewhere herein, a stream-cut event can indicate a progress position in the stream at an event boundary and can be used as a frame boundary. A frame boundary can apply to one or more segments of one or more streams of an OES system. The frame boundary of the OES can correspond to a boundary in cached events in a frame fetch component.

At 830, method 800 can comprise permitting a first reader application and a second reader application to read events from the frame fetch component up to first events corresponding to the first frame boundary of the ordered event stream, wherein the first and second reader applications correspond to the framing group instance. As an example, at 830, method 800 applied in system 400 can read events along line 450 and shaded area 452, between frame boundaries 440 and 444, into a frame fetch component. Reading of the cached events from frame fetch component can correspond to reading events along 450 and 452 up to events bounded by boundary 442 in the OES. However, in this example, where reading along 452 can be substantially slower than reading along 450, caching of the events along 450 can allow the corresponding processor to be employed in other operations as framing is applied to the cached events in the frame fetch component.

Method 800, at 840, can comprise, in response to determining that all reader applications corresponding to the framing group instance, including the first and second reader applications, satisfy a rule corresponding to the first frame boundary, permitting the first reader application and the second reader application to read other events from the frame fetch component up to second events corresponding to a second frame boundary of the ordered event stream. At this point method 800 can end. In an aspect, where a first reader reaches the cached event corresponding to the first frame boundary, reading by the first reader can be suspended in the cache until other readers catch up, e.g., all reader applications, including the first and second reader applications, can be determined to satisfy a rule corresponding to the first frame boundary before the readers are permitted to read cached events beyond the frame boundary, e.g., up to a second frame boundary. It is noted that the caching, while allowing for more efficient use of computing resources in comparison to more rapid cycling of readers at each boundary, can also increase use of computing resources in regard to temporarily storing cached events from segments of an OES. However, there can generally be little other additional computing resource overhead due to events being read traversing a communication framework in both a cached and non-cached systems, and comparatively small cache sizes in comparison to frame sizes. As such, prefetching can typically, for example, cache events for segments of just a few frames rather than caching entire segments of an OES, generally seeking to optimize providing free processor time or blocks of network communication in contrast to rapid cycling resulting from non-cached event read framing.

Figure 9:
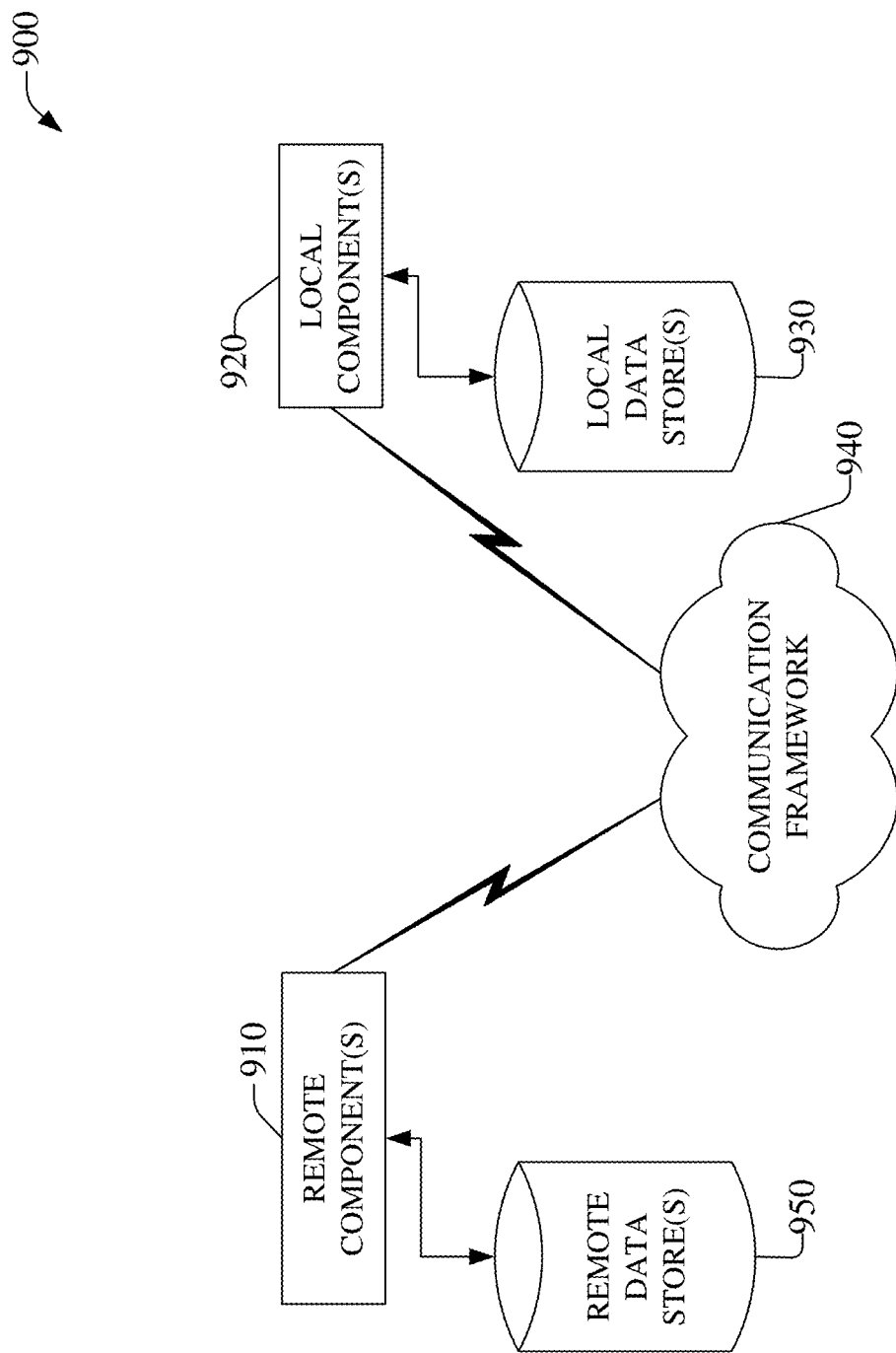
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102-602, etc., a remotely located processor device comprised in processor component 104-604, etc., a remotely located device comprised in event frame component 120-620, etc., or other remotely located devices, which can be connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102-602, etc., a locally located processor device comprised in processor component 104-604, etc., a locally located device comprised in event frame component 120-620, etc., or other locally located devices.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, writing, reading, erasing, expiring, caching, framing, etc., of events of segments of an OES(s) in systems 100-600, etc., can be communicated via communication framework 940 among storage components of an OES storage network 100-600, etc., e.g., to facilitate adapting, altering, modifying, erasing, deleting, freeing, caching, framing, etc., events stored via one or more OES(s), as disclosed herein.

Figure 10:
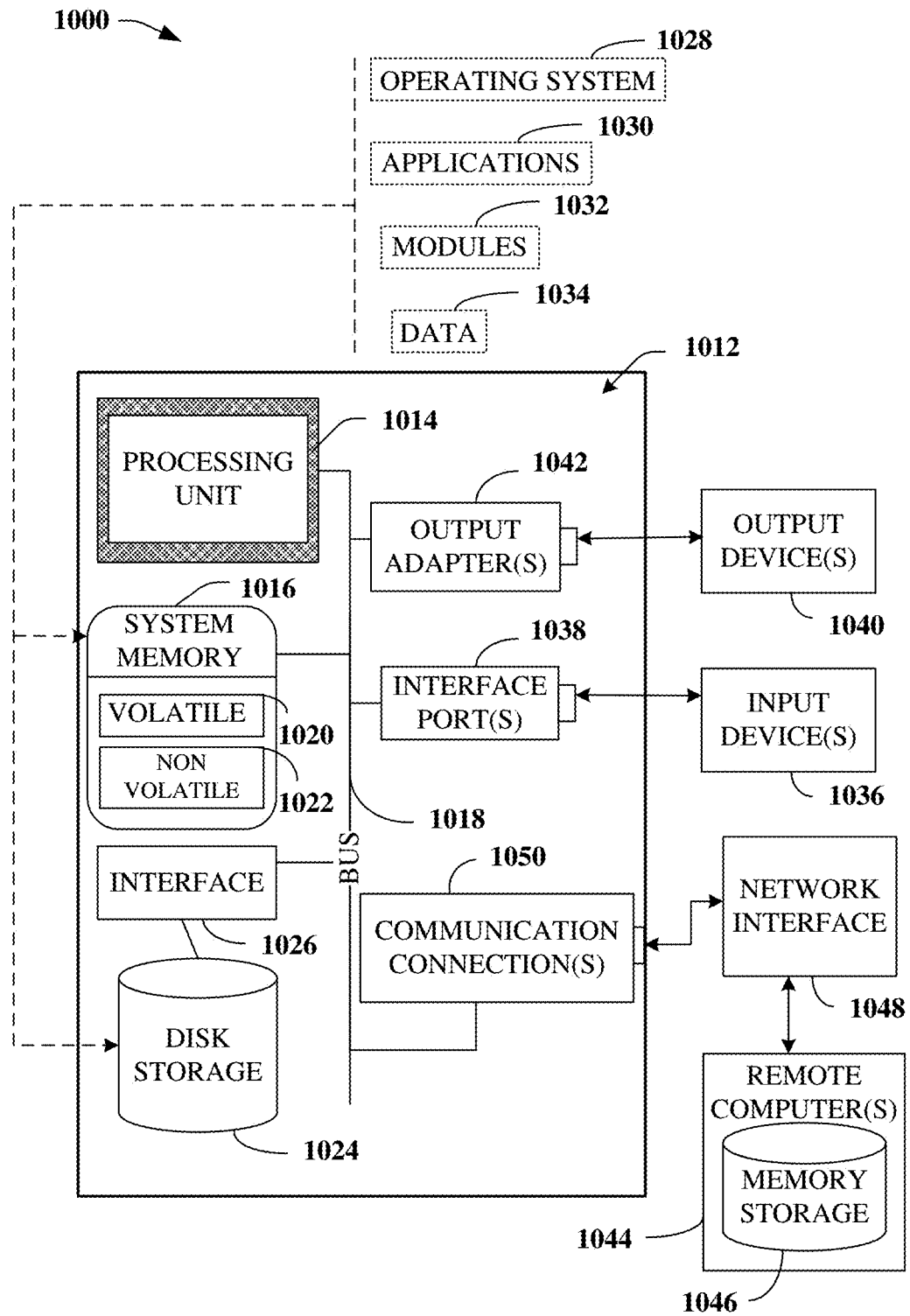
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102-602, processor component 104-604, EFC 120-620, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising generating frame boundaries and enabling a first reader application to read a first portion of the events up to a first boundary. Then, in response to determining that all reader applications satisfy a rule corresponding to the first boundary, enabling the first reader application to read a second portion of the events occurring between the first boundary and the second boundary.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        determining a first frame boundary for an ordered event stream stored via an ordered event stream storage system, wherein the first frame boundary corresponds to a first event boundary of a first event of first events stored according to a first segment of the ordered event stream;
        permitting a first reader application to read a first portion of the first events of the first segment of the ordered event stream up to the first event boundary based on the first frame boundary, wherein a group of reader applications corresponding to a first framing group instance comprises the first reader application; and
        in response to determining that all reader applications of the group of reader applications satisfy a rule corresponding to the first frame boundary, permitting the first reader application to read a second portion of the first events up to a second event of the first events based on a second frame boundary that corresponds to the framing group instance.

2. The system of claim 1, wherein the ordered event stream comprises two or more parallel segments.

3. The system of claim 2, wherein the first and second frame boundaries correspond to events of the first events stored via the two or more parallel segments.

4. The system of claim 1, wherein the rule corresponding to the first frame boundary is determined to be satisfied in response to all reader application having read events up to the first frame boundary.

5. The system of claim 1, wherein the operations further comprise, in response to determining that all reader applications of the group of reader applications satisfy the rule corresponding to the first frame boundary, permitting a second reader application to read a third portion of the first events up to a third event of the first events based on the second frame boundary.

6. The system of claim 1, wherein the first frame boundary correlates to a temporal progress point of the ordered event stream.

7. The system of claim 1, wherein the first frame boundary correlates to a count-of-events progress point of the ordered event stream.

8. The system of claim 1, wherein the permitting the first reader application to read up to the first event boundary comprises conditionally withholding permission for the first reader application to read past the first event boundary.

9. The system of claim 1, wherein an event frame periodicity corresponds to a measure of stream progress between the second event boundary and the first event boundary.

10. The system of claim 9, wherein a third event boundary occurs in conjunction with the event frame periodicity.

11. The system of claim 1, wherein reading the first portion of the first events comprises reading the first portion of the first events from cached replicas of the first portion of the first events stored via the ordered event stream.

12. The system of claim 11, wherein the cached replicas of the first portion of the first events are fetched without event framing.

13. A method, comprising:
    receiving, by system comprising a processor, frame boundaries comprising a first boundary and a second boundary, wherein the frame boundaries correspond to progress points for an ordered event stream stored via an ordered event stream storage system, wherein the ordered event stream comprises a first segment and a second segment, wherein the first and second segments are parallel segments, and wherein the frame boundaries correspond to events stored via the first and second segments;
    permitting, by the system, a first reader application to read, up to the first boundary, a first portion of the events stored via the first segment;
    determining, by the system, that all reader applications of a group of reader applications satisfy a rule corresponding to the first boundary, wherein the group of reader applications comprises the first reader application; and
    based on the rule being determined to have been satisfied, permitting, by the system, the first reader application to read a second portion of the first events occurring between the first boundary and the second boundary.

14. The method of claim 13, wherein the first and second boundary are in accord with a periodic ordered event stream progress value.

15. The method of claim 14, wherein periodic ordered event stream progress value enables frame boundary occlusion comprising substituting frame boundaries of a lesser period for frame boundaries of a greater period.

16. The method of claim 13, wherein reading the first portion of the events up to the first boundary comprises caching a replica of the first portion of the events.

17. A non-transitory machine-readable medium, comprising executable instructions that, when executed by a processor, facilitate performance of operations, comprising:
    generating frame boundaries comprising a first boundary and a second boundary, wherein the frame boundaries correspond to progress points for an ordered event stream stored via an ordered event stream storage system, wherein the ordered event stream comprises a first segment and a second segment, wherein the first and second segments are parallel segments, and wherein the frame boundaries correspond to events stored via the first and second segments;
    enabling a first reader application to read, up to the first boundary, a first portion of the events stored via the first segment; and
    in response to determining that all reader applications of a group of reader applications satisfy a rule corresponding to the first boundary, wherein the group of reader applications comprises the first reader application, enabling the first reader application to read a second portion of the events occurring between the first boundary and the second boundary.

18. The non-transitory machine-readable medium of claim 17, wherein the generating the frame boundaries comprises generating periodic frame boundaries based on an ordered event stream progress value.

19. The non-transitory machine-readable medium of claim 18, wherein the periodic frame boundaries enable frame boundary occlusion.

20. The non-transitory machine-readable medium of claim 19, wherein reading the first portion of the events up to the first boundary comprises fetching the first portion of the events for temporary storage via a cache, and reading the first portion of the events from the cache according to event framing based on at least the first boundary.

* * * * *